(12) United States Patent
Hu et al.

(10) Patent No.: US 11,803,280 B2
(45) Date of Patent: Oct. 31, 2023

(54) TOUCH PANEL WITH MODIFIED TOUCH ELECTRODES ADJACENT TO THE NON-TOUCH AREA AND ELECTRONIC DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Hongjin Hu, Beijing (CN); Mingqiang Wang, Beijing (CN); Jiaxiang Zhang, Beijing (CN); Chang Wang, Beijing (CN); Kun Zuo, Beijing (CN); Cunzhi Li, Beijing (CN); Fei Li, Beijing (CN); Yonglin Chen, Beijing (CN); Xi Bi, Beijing (CN); Bin Zhang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

(*) Notice: Subject to any disclaimer, the term of this patent is extended or adjusted under 35 U.S.C. 154(b) by 246 days.

(21) Appl. No.: 17/309,654

(22) PCT Filed: Aug. 18, 2020

(86) PCT No.: PCT/CN2020/109732
§ 371 (c)(1),
(2) Date: Jun. 11, 2021

(87) PCT Pub. No.: WO2022/036543
PCT Pub. Date: Feb. 24, 2022

(65) Prior Publication Data
US 2022/0308700 A1 Sep. 29, 2022

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0445* (2019.05); *G06F 2203/04111* (2013.01)

(58) Field of Classification Search
CPC .... G06F 3/0446; G06F 3/0412; G06F 3/0445; G06F 2203/04111
See application file for complete search history.

(56) References Cited

U.S. PATENT DOCUMENTS 10,592,016 B2   3/2020   Jeon et al.
10,915,190 B2   2/2021   Gong
(Continued)

FOREIGN PATENT DOCUMENTS

CN   102893244 A   1/2013
CN   105094495 A   11/2015
(Continued)

*Primary Examiner* — Liliana Cerullo
(74) *Attorney, Agent, or Firm* — Kinney & Lange, P.A.

(57) ABSTRACT

Disclosed are a touch panel and an electronic device, the touch panel is provided with a touch area and a non-touch area surrounding the touch area, a plurality of first touch electrodes and a plurality of second touch electrodes are all located in the touch area, a plurality of connecting portions include a first connecting portion, a second connecting portion, and a third connecting portion sequentially away from the non-touch area in a first direction, and a distance between a center of an orthographic projection of the first connecting portion on a substrate and a center of an orthographic projection of the second connecting portion on the substrate is less than a distance between the center of the orthographic projection of the second connecting portion on
(Continued)

the substrate and a center of an orthographic projection of the third connecting portion on the substrate.

18 Claims, 15 Drawing Sheets

(56) References Cited

U.S. PATENT DOCUMENTS

| | | | |
|---|---|---|---|
| 11,068,087 B2 | 7/2021 | Jeon et al. | |
| 11,163,387 B2 | 9/2021 | Jeon et al. | |
| 2010/0051355 A1 | 3/2010 | Yang | |
| 2016/0179233 A1* | 6/2016 | Li | G06F 3/0446 |
| | | | 345/173 |
| 2017/0307924 A1 | 10/2017 | Liu et al. | |
| 2018/0074609 A1 | 3/2018 | Jeon et al. | |
| 2018/0120988 A1* | 5/2018 | Kim | G06F 3/0418 |
| 2019/0204974 A1 | 7/2019 | Gong | |
| 2020/0183512 A1 | 6/2020 | Jeon et al. | |
| 2020/0183513 A1 | 6/2020 | Jeon et al. | |
| 2020/0371644 A1* | 11/2020 | Choi | G06F 3/0412 |
| 2021/0124457 A1 | 4/2021 | Gong | |
| 2021/0296421 A1* | 9/2021 | Moon | G06F 3/044 |

FOREIGN PATENT DOCUMENTS

| | | |
|---|---|---|
| CN | 107390963 A | 11/2017 |
| CN | 107422923 A | 12/2017 |
| CN | 107807748 A | 3/2018 |
| CN | 109725774 A | 5/2019 |

\* cited by examiner

TOUCH PANEL WITH MODIFIED TOUCH ELECTRODES ADJACENT TO THE NON-TOUCH AREA AND ELECTRONIC DEVICE

CROSS REFERENCE TO RELATED APPLICATION

This application is a Section 371 National Stage Application of International Application No. PCT/CN2020/109732, filed on Aug. 18, 2020, entitled "TOUCH PANEL AND ELECTRONIC DEVICE", which is incorporated herein by reference in their entirety.

TECHNICAL FIELD

The present disclosure relates to a field of touch technology, and in particular to a touch panel and an electronic device.

BACKGROUND

With a diversified development of human needs, as an early device used for timekeeping, mechanical watches have been continuously enriched in their functions. For example, while a mechanical watch was used for timekeeping, people began to add flexible rotating mechanical roulettes to a periphery of the mechanical watch for rapid conversion of multiple time zones, unit conversion, speed measurement, direction identification, etc. Mechanical watches became a necessity in people's lives in early days, so mechanical watches play an extremely important role in human social life. At the same time, with a continuous advancement of today's semiconductor technology, wearable electronic watches have also emerged. Due to eye-catching multimedia interface design and comfortable human-computer interaction experience of wearable electronic watches, wearable electronic watches are widely sought after by young people.

SUMMARY

Some embodiments of the present disclosure provides a touch panel, including: a substrate; a plurality of first touch electrodes on the substrate and extend in a first direction, wherein at least one first touch electrode includes a plurality of first sub-electrodes and a plurality of first connecting sub-portions, the plurality of first sub-electrodes electrically connected to each other, and the plurality of first connecting sub-portions are located between two adjacent first sub-electrodes and electrically connect the two adjacent first sub-electrodes; and a plurality of second touch electrodes on the substrate and extend in a second direction, wherein the second direction intersects the first direction, at least one second touch electrode comprises a plurality of second sub-electrodes and a plurality of second connecting sub-portions, the plurality of second sub-electrodes electrically connected to each other, and the plurality of second connecting sub-portions are located between two adjacent second sub-electrodes and electrically connect the two adjacent second sub-electrodes; wherein the plurality of first connecting sub-portions at least partially overlap with the plurality of second connecting sub-portions, so that overlapping structures are formed by the first connecting sub-portions and the second connecting sub-portions as a plurality of connecting portions, and the first touch electrodes and the second touch electrodes are electrically insulated from each other; wherein the touch panel is provided with a touch area and a non-touch area surrounding the touch area; wherein the plurality of first touch electrodes and the plurality of second touch electrodes are all located in the touch area, the plurality of connecting portions comprise a first connecting portion, a second connecting portion, and a third connecting portion sequentially away from the non-touch area in the first direction, the first connecting portion and the second connecting portion are adjacent in the first direction, and the second connecting portion and the third connecting portion are adjacent in the first direction; and a distance between a center of an orthographic projection of the first connecting portion on the substrate and a center of an orthographic projection of the second connecting portion on the substrate is less than a distance between the center of the orthographic projection of the second connecting portion on the substrate and a center of an orthographic projection of the third connecting portion on the substrate.

In some embodiments, the at least one first touch electrode includes a first one of the first sub-electrodes, a second one of the first sub-electrodes and a third one of the first sub-electrodes sequentially away from the non-touch area in the first direction, the first one of the first sub-electrodes is adjacent to the second one of the first sub-electrodes, the second one of the first sub-electrodes is adjacent to the third one of the first sub-electrodes, and the first one of the first sub-electrodes is adjacent to the non-touch area, wherein the first connecting portion is located between the first one of the first sub-electrodes and the second one of the first sub-electrodes, and the first connecting portion is electrically connected to both the first one of first sub-electrodes and the second one of the first sub-electrodes; wherein the second connecting portion is located between the second one of the first sub-electrodes and the third one of the first sub-electrodes, and the second connecting portion is electrically connected to both the second one of the first sub-electrodes and the third one of the first sub-electrodes; and wherein the third connecting portion is located on a side of the third one of the first sub-electrodes away from the second connecting portion, and the third connecting portion is electrically connected to the third one of the first sub-electrodes.

In some embodiments, the plurality of connecting portions include a fourth connecting portion, a fifth connecting portion, and a sixth connecting portion sequentially away from the non-touch area in the second direction, the fourth connecting portion and the fifth connecting portion are adjacent in the second direction, the fifth connecting portion and the sixth connecting portion are adjacent in the second direction; and wherein a distance between a center of an orthographic projection of the fourth connecting portion on the substrate and a center of an orthographic projection of the fifth connecting portion on the substrate is less than a distance between the center of the orthographic projection of the fifth connecting portion on the substrate and a center of an orthographic projection of the sixth connecting portion on the substrate.

In some embodiments, the at least one second touch electrode includes a first one of the second sub-electrodes, a second one of the second sub-electrodes, and a third one of the second sub-electrodes sequentially away from the non-touch area in the second direction, the first one of the second sub-electrodes is adjacent to the second one of the second sub-electrodes, the second one of the second sub-electrodes is adjacent to the third one of the second sub-electrodes, and the first one of the second sub-electrode is adjacent to the non-touch area; wherein the fourth connecting portion is located between the first one of the second sub-electrodes and the second one of the second sub-electrodes, and the fourth connecting portion is electrically connected to both the first one of the second sub-electrodes and the second one of the second sub-electrodes; wherein the fifth connecting portion is located between the second one of the second sub-electrode and the third one of the second sub-electrode, and the fifth connecting portion is electrically connected to both the second one of the second sub-electrode and the third one of the second sub-electrode; and wherein the sixth connecting portion is located on a side of the third one of the second sub-electrodes away from the fifth connecting portion, and the sixth connecting portion is electrically connected to the third one of the second sub-electrodes.

In some embodiments, a difference between the distance from the center of the orthographic projection of the first connecting portion on the substrate to the center of the orthographic projection of the second connecting portion on the substrate and the distance from the center of the orthographic projection of the second connecting portion on the substrate to the center of the orthographic projection of the third connecting portion on the substrate is less than or equal to ½ of a maximum length of the third one of the first sub-electrodes between the second connecting portion and the third connecting portion in the first direction.

In some embodiments, a difference between the distance from the center of the orthographic projection of the first connecting portion on the substrate to the center of the orthographic projection of the second connecting portion on the substrate and the distance from the center of the orthographic projection of the second connecting portion on the substrate to the center of the orthographic projection of the third connecting portion on the substrate is equal to about ¼ of the maximum length of the third one of the first sub-electrode between the second connecting portion and the third connecting portion in the first direction.

In some embodiments, areas of the first one of the first sub-electrodes and the second one of the first sub-electrodes adjacent to the first connecting portion both occupy 50%-100% of an area of the third one of the first sub-electrodes between the second connecting portion and the third connecting portion.

In some embodiments, areas of two second sub-electrodes adjacent to the first connecting portion both occupy 50%-100% of an area of one second sub-electrode of two second sub-electrodes adjacent to and electrically connected to the third connecting portion, and the one second sub-electrode is farther away from the non-touch area.

In some embodiments, the areas of the first one of the first sub-electrodes and the second one of the first sub-electrodes adjacent to the first connecting portion and the areas of the two second sub-electrodes adjacent to the first connecting portion are all smaller than an area of the third one of the first sub-electrodes between the second connecting portion and the third connecting portion.

In some embodiments, a difference between the distance from the center of the orthographic projection of the fourth connecting portion on the substrate to the center of the orthographic projection of the fifth connecting portion on the substrate and the distance from the center of the orthographic projection of the fifth connecting portion on the substrate to the center of the orthographic projection of the sixth connecting portion on the substrate is less than or equal to ½ of a maximum length of the third one of the second sub-electrodes between the fifth connecting portion and the sixth connecting portion in the second direction.

In some embodiments, a difference between the distance from the center of the orthographic projection of the fourth connecting portion on the substrate to the center of the orthographic projection of the fifth connecting portion on the substrate and the distance between the center of the orthographic projection of the fifth connecting portion to the substrate and the center of the orthographic projection of the sixth connecting portion on the substrate is equal to about ¼ of the maximum length of the third one of the second sub-electrodes between the fifth connecting portion and the sixth connecting portion in the second direction.

In some embodiments, areas of the first one of the second sub-electrodes and the second one of the second sub-electrodes adjacent to the fourth connecting portion both occupy 50%-100% of an area of the third one of the second sub-electrodes between the fifth connecting portion and the sixth connecting portion.

In some embodiments, areas of two first sub-electrodes adjacent to the fourth connecting portion both occupy 50%-100% of an area of one first sub-electrode of two first sub-electrodes adjacent to and electrically connected to the sixth connecting portion, and the one first sub-electrode is farther away from the non-touch area.

In some embodiments, the areas of the first one of the second sub-electrodes and the second one of the second sub-electrodes adjacent to the fourth connecting portion and the areas of the two first sub-electrodes adjacent to the fourth connecting portion are all smaller than an area of the third one of the second sub-electrodes between the fifth connecting portion and the sixth connecting portion.

In some embodiments, at least a part of a boundary between the touch area and the non-touch area is arc-shaped.

In some embodiments, for one of the plurality of connecting portions, the one connecting portion includes: the first connecting sub-portion in the first direction, wherein the first connecting sub-portion electrically connects two first sub-electrodes adjacent in the first direction; and the second connecting sub-portion in the second direction, wherein the second connecting sub-portion electrically connects two second sub-electrodes adjacent in the second direction.

In some embodiments, one of the first connecting sub-portion and the second connecting sub-portion is located on a first electrode layer with the first touch electrode and the second touch electrode; the other one of the first connecting sub-portion and the second connecting sub-portion is located on a second electrode layer; and an insulating layer is provided between the first electrode layer and the second electrode layer.

In some embodiments, the first connecting sub-portion and the two first sub-electrodes adjacent in the first direction are an integral structure, and the second connecting sub-portion is electrically connected to the two second sub-electrodes adjacent in the second direction through a via hole penetrating the insulating layer.

In some embodiments, the second connecting sub-portion and the two second sub-electrodes adjacent in the second direction are an integral structure, and the first connecting sub-portion is electrically connected to the two first sub-electrodes adjacent in the first direction through a via hole penetrating the insulating layer.

In some embodiments, a maximum length of the first connecting portion in the first direction is equal to about ¼ of a maximum length of the first sub-electrode between the second connecting portion and the third connecting portion in the first direction.

In some embodiments, a maximum length of the second connecting portion in the second direction is equal to about ¼ of a maximum length of one of two second sub-electrodes adjacent to and electrically connected to the third connecting portion, and the one second sub-electrode is farther away from the non-touch area.

In some embodiments, the first connecting sub-portion comprises a first one of the first connecting sub-portions and a second one of the first connecting sub-portions arranged at an interval in the second direction, the first one of the first connecting sub-portions is bent toward the second one of the first connecting sub-portions, and the second one of the first connecting sub-portions is bent toward the first one of the first connecting sub-portions.

In some embodiments, a bent portion of at least one of the first one of the first connecting sub-portions and the second one of the first connecting sub-portions is a rounded corner.

In some embodiments, a bending angle of at least one of the first one of the first connecting sub-portions and the second one of the first connecting sub-portions is 130°~150°.

In some embodiments, the connecting portion further includes a first via hole, a second via hole, a third via hole, and a fourth via hole, the first one of the first connecting sub-portions is respectively electrically connected to the two first sub-electrodes adjacent in the first direction through the first via hole and the second via hole, and the second one of the first connecting sub-portions is respectively electrically connected to the two first sub-electrodes adjacent in the first direction through the third via hole and the fourth via hole.

In some embodiments, an edge of the second connecting sub-portion includes: a first polyline facing the first via hole and extending in a third direction; a second polyline facing the second via hole and in a fourth direction; a third polyline facing the third via hole and in the fourth direction; and a fourth polyline facing the fourth via hole and in the third direction, wherein the third direction and the fourth direction both intersect each of the first direction and the second direction, the third direction intersects the fourth direction, the first polyline is connected to the third polyline, and the second polyline is connected to the fourth polyline.

In some embodiments, the first via hole, the second via hole, the third via hole, and the fourth via hole are all rectangular, long sides of the first via hole and the fourth via hole are both parallel to the third direction, and long sides of the second via hole and the third via hole are both parallel to the fourth direction.

In some embodiments, for at least one connecting portion, at least one first sub-electrode adjacent to and electrically connected to the at least one connecting portion is provided adjacent to at least one second sub-electrode adjacent to and electrically connected to the at least one connecting portion, and a boundary between the first sub-electrode and the second sub-electrode is in a shape of polyline.

In some embodiments, the plurality of connecting portions constitute a connecting portion array, the connecting portion array includes a plurality of columns of connecting portions extended in the first direction and a plurality of rows of connecting portions extended in the second direction, a center of an orthographic projection of a connecting portion in the plurality of columns of the connecting portions column closest to the non-touch area on the substrate is on a straight line, and a center of an orthographic projection of a connecting portion in the plurality of rows of the connecting portions closest to the non-touch area on the substrate is on a straight line.

In some embodiments, one of the first touch electrode and the second touch electrode is a touch driving electrode, and the other one of the first touch electrode and the second touch electrode is a touch sensing electrode.

The present disclosure provides an electronic device, including the touch panel of above-mentioned embodiments.

BRIEF DESCRIPTION OF THE DRAWINGS

By reading the detailed description of non-limiting embodiments with reference to following drawings, other features, purposes and advantages of the present disclosure will become more apparent.

DETAILED DESCRIPTION OF EMBODIMENTS

Figure 1:
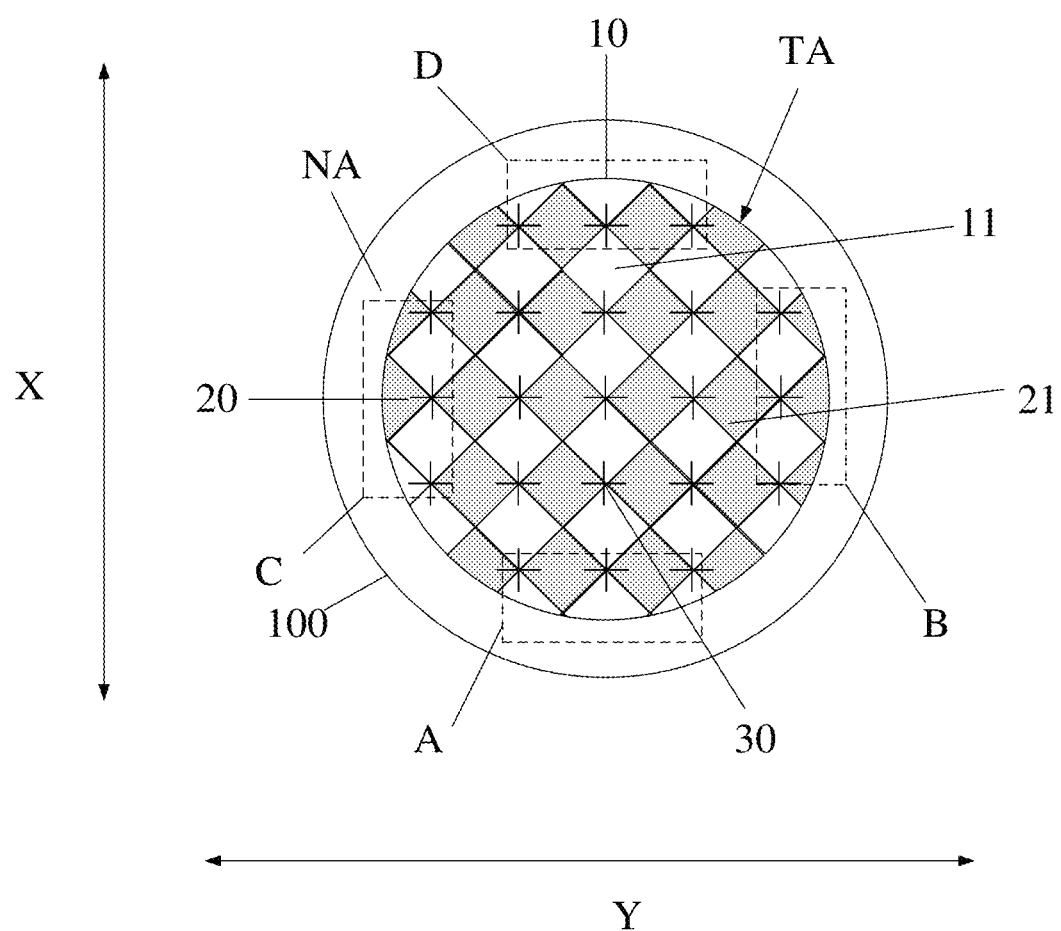
FIG. 1 is a schematic diagram of a planar structure of a touch panel according to some embodiments of the present disclosure.

The present disclosure will be further described in detail below with reference to drawings and embodiments. It should be understood that specific embodiments described here are only used to explain related invention, but not to limit the invention. In addition, it should be noted that, for ease of description, only parts related to the invention are shown in drawings.

It should be noted that the embodiments in the present disclosure and features in the embodiments may be combined with each other in case of no conflict.

In addition, in the following detailed description, for ease of explanation, many specific details are set forth to provide a comprehensive understanding of the embodiments of the present disclosure. However, it is obvious that one or more embodiments may also be implemented without the specific details.

It should be understood that, although the terms such as first, second, etc. in the present disclosure may be used to describe various elements, the elements should not be limited by the terms. The terms are only used to distinguish one element from another element. For example, without departing from a scope of an exemplary embodiment, a first element may be named as a second element, and similarly, a second element may be named as a first element. The term "and/or" as used here includes any and all combinations of one or more of related listed items.

It should be understood that when an element or layer is referred to as being "formed on" another element or layer, the element or layer may be directly or indirectly formed on the another element or layer. That is, for example, there may be an intermediate element or an intermediate layer. In contrast, when an element or layer is referred to as being "directly formed on" another element or layer, there is no intervening element or intervening layer. Other terms used to describe relationships between elements or layers should be interpreted in a similar manner (for example, "between" and "directly between", "adjacent" and "directly adjacent", etc.).

The terms used in the present disclosure are only for a purpose of describing specific embodiments, and are not intended to limit the embodiments. As used herein, unless otherwise clearly indicated, a singular form is also intended to include a plural form. It will also be understood that when the a term "comprise" and/or "include" is used in the present disclosure, it represents presences of features, wholes, steps, operations, elements and/or components, but it does not exclude a presence or addition of one or more other features, wholes, steps, operations, elements, components and/or their combinations.

In the present disclosure, unless otherwise specified, the terms "located on the same layer" and "provided on the same layer" generally mean that a first component and a second component may be formed by the same material and may be formed by the same patterning process. The terms "located on different layers" and "provided on different layers" generally mean that a first component and a second component are formed by different patterning processes.

A wearable electronic watch in the related art includes a touch screen and electronic components. The touch screen on the wearable electronic watch may not realize a digital roulette function similar to a mechanical roulette function of a traditional mechanical watch. For related wearable products, it is difficult for users to realize the mechanical roulette function similar to the traditional mechanical watch by sliding a periphery of the touch screen of the wearable electronic watch.

The present disclosure provides a touch panel including: a substrate and a plurality of first touch electrodes and a plurality of second touch electrodes that are arranged on the substrate. The plurality of first touch electrodes extend in a first direction, and at least one first touch electrode includes a plurality of first sub-electrodes electrically connected to each other; the plurality of second touch electrodes extend in a second direction, the second direction intersects the first direction, and at least one second touch electrode includes a plurality of second sub-electrodes electrically connected to each other. A plurality of connecting portions are provided at intersections of the plurality of first touch electrodes and the plurality of second touch electrodes, at least one connecting portion is located between two first sub-electrodes adjacent in the first direction and electrically connects the two adjacent first sub-electrodes, and the at least one connecting portion is located between two second sub-electrodes adjacent in the second direction and electrically connects the two adjacent second sub-electrodes. The first touch electrodes and the second touch electrodes are electrically insulated from each other at the connecting portions. The touch panel is provided with a touch area and a non-touch area surrounding the touch area, the plurality of first touch electrodes and the plurality of second touch electrodes are all located in the touch area. The plurality of connecting portions include a first connecting portion, a second connecting portion and a third connecting portion that are sequentially arranged away from the non-touch area in the first direction, and the first connecting portion, the second connecting portion and the third connecting portion are sequentially adjacent to each other in the first direction. A distance between a center of an orthographic projection of the first connecting portion on the substrate and a center of an orthographic projection of the second connecting portion on the substrate is less than that a distance between the center of the orthographic projection of the second connecting portion on the substrate and a center of an orthographic projection of the third connecting portion on the substrate.

In some embodiments, the first connecting portion is a connecting portion closest to the non-touch area.

The touch panel may increase areas of the first sub-electrodes and the second sub-electrodes that are located at a boundary of the touch panel between the touch area and the non-touch area. The touch panel improves a touch effect of the boundary between the touch area and the non-touch area (that is, an edge are of the touch area), and realizes the digital roulette function.

The digital roulette function herein refers to a touch function triggered by sliding the edge area of the touch area of the touch panel. For example, for an electronic device that includes a touch panel, such as an electronic watch, a human finger sliding an edge area of a screen triggers a slide touch signal, the slide touch signal is received by a controller of the electronic device, and then a specific display is performed on the electronic watch to realize the digital roulette function. Through the digital roulette function, more colorful scenarios for life, study and work application may be developed. For example, we may set a timing of an alarm clock, a brightness of a screen, a volume of a sound level, a speed of a playing music, and a switch of multi-function screens, etc. by sliding up and down on an edge area of an electronic device, such as an electronic watch.

FIG. 1 is a schematic diagram of a planar structure of a touch panel according to some embodiments of the present disclosure. As shown in FIG. 1, some embodiments of the present disclosure provide a touch panel. The touch panel includes a substrate 100 and a plurality of first touch electrodes 10 and a plurality of second touch electrodes 20 on the substrate 100. The plurality of first touch electrodes 10 extend in a first direction X, and each first touch electrode 10 includes a plurality of first sub-electrodes 11 electrically connected to each other. The plurality of second touch electrodes 20 extend in a second direction Y, the second direction Y intersects the first direction X, for example, the second direction Y is perpendicular to the first direction X. Each second touch electrode 20 includes a plurality of second sub-electrodes 21 electrically connected to each other. A plurality of connecting portions 30 are provided at intersections of the plurality of first touch electrodes 10 and the plurality of second touch electrodes 20, each connecting portion 30 is located between two first sub-electrodes 11 adjacent in the first direction X and electrically connects two adjacent first sub-electrodes 11, and each connecting portion 30 is located between two second sub-electrodes 21 adjacent in the second direction Y and electrically connects two adjacent second sub-electrodes 21. At the connecting portion 30, the first touch electrode 10 and the second touch electrode 20 are electrically insulated from each other.

With reference to FIG. 1 and subsequent FIGS. 6-9 in conjunction, each first touch electrode 10 includes a plurality of first sub-electrodes 11 and a plurality of first connecting sub-portions 31, the plurality of first sub-electrodes 11 are electrically connected to each other, and the plurality of first connecting sub-portions 31 are located between two adjacent first sub-electrodes 11 and electrically connect two adjacent first sub-electrodes 11. Each second touch electrode 20 includes a plurality of second sub-electrodes 21 and a plurality of second connecting sub-portions 32, the plurality of second sub-electrodes 21 are electrically connected to each other, and the plurality of second connecting sub-portions 32 are located between two adjacent second sub-electrodes 21 and electrically connect two adjacent second sub-electrodes 21. The first connecting sub-portion 31 partially overlaps with the second connecting sub-portion 32, and an overlapping structure formed by the first connecting sub-portion 31 and the second connecting sub-portion 32 is the connecting portion 30.

The touch panel is provided with a touch area TA and a non-touch area NA surrounding the touch area TA, and the plurality of first touch electrodes 10 and the plurality of second touch electrodes 20 are all located in the touch area TA.

Herein, the first touch electrode 10 may be one of a touch driving electrode and a touch sensing electrode, and the second touch electrode 20 may be the other one of the touch driving electrode and the touch sensing electrode. The touch driving electrode is configured to access a touch transmitting signal, and the touch sensing electrode is configured to sense a touch sensing signal based on the touch transmitting signal.

Those skilled in the art may understand that FIG. 1 only schematically illustrates a planar structure of the touch panel, FIG. 1 is used to indicate a relative positional relationship between the first touch electrode 10, the second touch electrode 20, and the connecting portion 30, and is not intended to indicate actual sizes of the aforementioned components. In practical applications, sizes of the first sub-electrodes 11 of the first touch electrode 10, the second sub-electrodes 21 of the second touch electrode 20, and the connecting portions 30 are very small relative to the entire touch panel.

Figure 2:
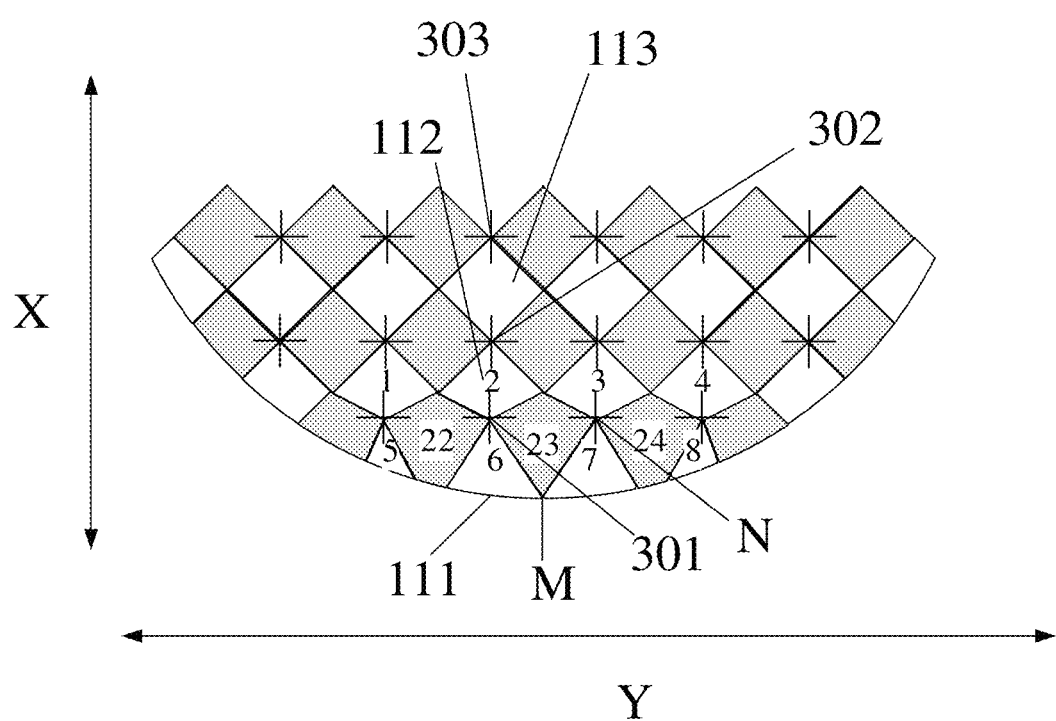
FIG. 2 is a schematic plan view of area A in FIG. 1.

FIG. 2 is a schematic plan view of area A in FIG. 1, FIG. 2 schematically illustrates a planar structure of a peripheral area of the touch panel, FIG. 2 only illustrates a part of the touch area TA, and the non-touch area NA is omitted. With reference to FIGS. 1 and 2, the touch area TA includes an edge area close to the non-touch area NA and a middle area surrounded by the edge area. The first sub-electrodes 11 and the second sub-electrodes 21 located in the middle area of the touch area TA are substantially regular patterns, such as diamonds, squares, grid lines, etc. At least some of the first sub-electrodes 11 and the second sub-electrodes 21 located in the edge area of the touch area TA, especially the first sub-electrodes 11 and the second sub-electrodes 21 adjacent to the non-touch area NA are irregular patterns.

As shown in FIGS. 1 and 2, the plurality of the connecting portions 30 are substantially arranged in an array. Taking a column of the connecting portions 30 in the first direction as an example, the column of the connecting portions 30 includes a first connecting portion 301, a second connecting portion 302 and a third connecting portion 303 sequentially arranged away from the non-touch area NA in the first direction X. The first connecting portion 301, the second connecting portion 302 and the third connecting portion 303 are sequentially adjacent to each other in the first direction X.

It should be noted that the "the first connecting portion 301, the second connecting portion 302 and the third connecting portion 303 are sequentially adjacent to each other in the first direction X" refers to that in the column of the connecting portions 30, the first connecting portion 301 and the second connecting portion 302 are adjacent and there is no other connecting portion between the first connecting portion 301 and the second connecting portion 302; the second connecting portion 302 and the third connecting portion 303 are adjacent and there is no other connecting portion between the second connecting portion 302 and the third connecting portion 303. In the embodiment, the first connecting portion 301 is a connecting portion closest to a lower side of the non-touch area NA in the column of the connecting portions 30.

The first touch electrode 10 corresponding to the column of the connecting portions 30 includes a first one of first sub-electrodes 111, a second one of first sub-electrodes 112 and a third one of first sub-electrodes 113 that are sequentially arranged away from the non-touch area NA in the first direction X, the first one of the first sub-electrodes 111, the second one of the first sub-electrodes 112 and the third one of the first sub-electrodes 113 are sequentially adjacent to each other in the first direction X, and the first one of the first sub-electrodes 111 is adjacent to the non-touch area NA. The first connecting portion 301 is located between the first one of the first sub-electrodes 111 and the second one of the first sub-electrodes 112, and the first connecting portion 301 is electrically connected to both the first one of the first sub-electrodes 111 and the second one of the first sub-electrodes 112. The second connecting portion 302 is located between the second one of the first sub-electrodes 112 and the third one of the first sub-electrodes 113, and the second connecting portion 302 is electrically connected to both the second one of the first sub-electrodes 112 and the third one of the first sub-electrodes 113. The third connecting portion 303 is located on a side of the third one of the first sub-electrodes 113 away from the second connecting portion 302, and the third connecting portion 303 is electrically connected to the third one of the first sub-electrodes 113.

As shown in FIG. 2, a distance between a center of an orthographic projection of the first connecting portion 301 on the substrate 100 and a center of an orthographic projection of the second connecting portion 302 on the substrate 100 is less than a distance between the center of the orthographic projection of the second connecting portion 302 on the substrate 100 and a center of an orthographic projection of the third connecting portion 303 on the substrate 100.

A plurality of columns of the connecting portions 30 adjacent to the column of the connecting portions 30 and the first touch electrodes 10 corresponding to the plurality of the columns of the connecting portions 30 are all configured in a similar manner. In this way, areas of the first sub-electrodes of the first touch electrodes 10 adjacent to the non-touch area NA are significantly larger than those of the related art, a touch effect at a boundary area between the touch area and the non-touch area (that is, the edge area of the touch area) is improved, thereby the digital roulette function is realized.

Figure 3:
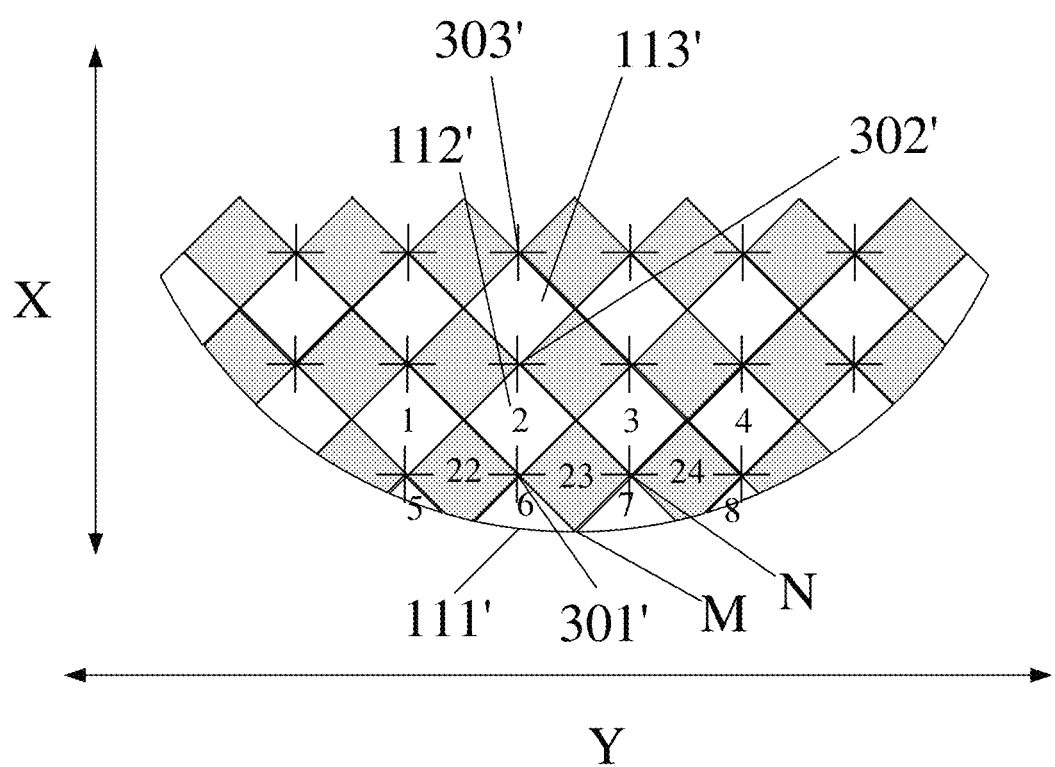
FIG. 3 is a schematic partial plan view of a touch panel in the related art.

FIG. 3 is a partial plan view of a touch panel in the related art, the structure in FIG. 3 corresponds to that in FIG. 2. As shown in FIGS. 1 and 3, a plurality of the connecting portions 30 are substantially arranged in an array. Taking a column of the connecting portions 30 extending in the first direction X as an example, the column of the connecting portions 30 corresponds to the column of the connecting portions 30 illustrated in FIG. 2. The column of the connecting portions 30 includes a first connecting portion 301', a second connecting portion 302', and a third connecting portion 303' that are sequentially arranged away from the non-touch area NA in the first direction X. The first connecting portion 301', the second connecting portion 302', and the third connecting portion 303' are sequentially adjacent to each other in the first direction X. The first connecting portion 301', the second connecting portion 302' and the third connecting portion 303' in FIG. 3 correspond to the first connecting portion 301, the second connecting portion 302 and the third connecting portion 303 shown in FIG. 2, respectively.

The first touch electrode 10 corresponding to the column of the connecting portions 30 includes a first one of first sub-electrodes 111', a second one of first sub-electrodes 112' and a third one of first sub-electrodes 113' that are sequentially arranged away from the non-touch area in the first direction X, and the first one of the first sub-electrodes 111', the second one of the first sub-electrodes 112' and the third one of the first sub-electrodes 113' are sequentially adjacent to each other in the first direction X. The first one of the first sub-electrodes 111' is adjacent to the non-touch area NA. The first connecting portion 301' is located between the first one of the first sub-electrodes 111' and the second one of the first sub-electrodes 112', and the first connecting portion 301' is electrically connected to both the first one of the first sub-electrodes 111' and the second one of the first sub-electrodes 111'. The second connecting portion 302' is located between the second one of the first sub-electrodes 112' and the third one of the first sub-electrodes 113', and the second connecting portion 302' is electrically connected to both the second one of the first sub-electrodes 112' and the third one of the first sub-electrodes 113'. The third connecting portion 303' is located on a side of the third one of the first sub-electrodes 113' away from the second connecting portion 302', and the third connecting portion 303' is electrically connected to the third one of the first sub-electrodes 113'. The first one of the first sub-electrodes 111', the second one of the first sub-electrodes 112', and the third one of the first sub-electrodes 113' shown in FIG. 3 correspond to the first one of the first sub-electrodes 111, the second one of the first sub-electrodes 112 and the third one of the first sub-electrodes 113 shown in FIG. 2, respectively.

As shown in FIG. 3, a distance between a center of an orthographic projection of the first connecting portion 301' on the substrate 100 and a center of an orthographic projection of the second connecting portion 302' on the substrate 100 is equal to a distance between the center of the orthographic projection of the second connecting portion 302' on the substrate 100 and a center of an orthographic projection of the third connecting portion 303' on the substrate 100. In FIG. 3, a plurality of columns of the connecting portions 30 adjacent to the column of the connecting portions 30 and first touch electrodes 10 corresponding to the plurality of the columns of the connecting portions 30 are all configured in a similar manner. As shown in FIG. 3, in the related art, areas of the first sub-electrodes 11 at a boundary area between the touch area TA and the non-touch area NA are small, and areas of some of the first sub-electrodes 11 are less than or equal to 50% of an area of a normal sub-electrode. The normal sub-electrode here refers to a first sub-electrode (also referred to as a normal first sub-electrode)/or a second sub-electrode (also referred to as a normal second sub-electrode), which are located in a middle area of the touch area TA and substantially have regular patterns, such as rhombuses, squares, grid lines, etc. In the related art, some of the first sub-electrodes and/or the second sub-electrodes located at the boundary area between the touch area TA and the non-touch area NA are too small, resulting in a low touch signal strength in the edge area of the touch area, so that a touch signal and a background noise signal may not be distinguished, and the digital roulette function may not be realized.

In order to facilitate understanding, on basis of the related technology shown in FIG. 3, the touch panel provided by the embodiment shown in FIG. 2 may be adjusted by moving a entire row of the connecting portions 30 closest to a lower side of the non-touch area NA away from the non-touch area NA in the first direction X, and shapes of the first sub-electrodes and the second sub-electrodes connected to each connecting portion 30 in the row of the connecting portions 30 are adjusted accordingly, so that an area of the first sub-electrode and/or the second sub-electrode located at the boundary area between the touch area TA and the non-touch area NA has a great relative uniformity, so as to avoid the area from being too small and improve a touch effect at the boundary area between the touch area and the non-touch area (that is, the edge area of the touch area), thereby the digital roulette function is realized.

A distance of the entire row of the connecting portions 30 closest to the lower side of the non-touch area NA moving away from the non-touch area NA in the first direction X is less than or equal to ½ of a maximum span of the normal first sub-electrode in the first direction X or a maximum length between two points on any side of the normal first sub-electrode (hereinafter referred to as a maximum length in the first direction X). That is to say, as shown in FIG. 2, a difference between the distance (which is between the center of the orthographic projection of the first connecting portion 301 on the substrate 100 and the center of the orthographic projection of the second connecting portion 302 on the substrate 100) and the distance (which is between the center of the orthographic projection of the second connecting portion 302 on the substrate 100 and the center of the orthographic projection of the third connecting portion 303 on the substrate 100) is less than or equal to ½ of a maximum length of the third one of the first sub-electrode 113 between the second connecting portion 302 and the third connecting portion 303 in the first direction (i.e. a length of a diagonal line of the third one of the first sub-electrode 113 in the first direction). In some embodiments, the distance of the row of the connecting portions 30 closest to the lower side of the non-touch area NA moving away from the non-touch area NA in the first direction X is less than or equal to about ½ of a maximum span of the normal first sub-electrode in the first direction X or a maximum length between two points on any side of the normal first sub-electrode. The "about ½" here refers to a value without strict limitation, as long as it is within a range of allowable process and error measurement.

At this time, the area of the first sub-electrode and/or the second sub-electrode located at the boundary area between the touch area TA and the non-touch area NA has a good relative uniformity, and a distance between any two adjacent connecting portions 30 may be prevented from being too small. The connecting portion 30 in the touch panel usually includes a metal bridge. A light transmittance of the metal bridge is almost zero due to a material property thereof. If the distance between two adjacent connecting portions 30 is too small, the two metal bridges of the two adjacent connecting portions will be connected together visually. When the touch panel is applied to an electronic device including a touch screen, black dot outlines appear on the touch screen, which seriously affects an image display of the screen.

Figure 11:
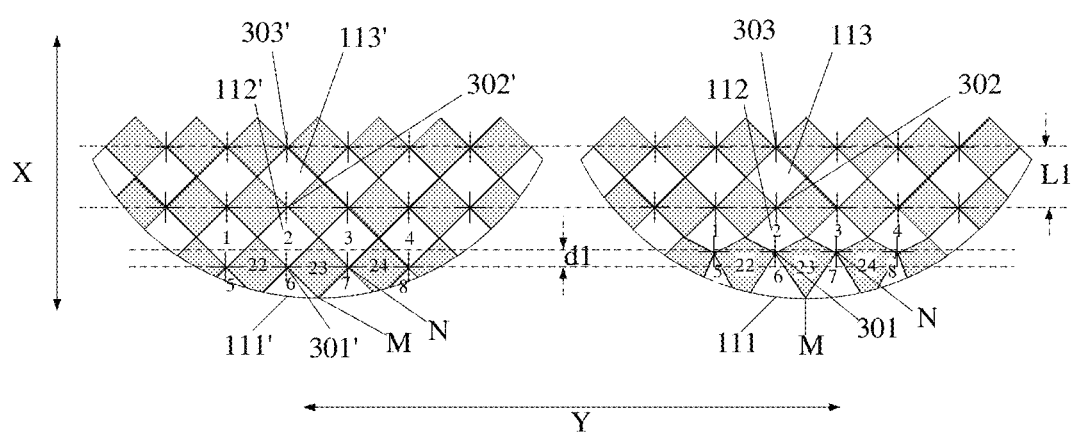
FIG. 11 is a comparison schematic diagram of the structures shown in FIG. 2 and FIG. 3.

In order to clearly reflect a position change of the row of the connecting portions 30 closest to the lower side of the non-touch area NA in FIG. 2 relative to that in the related art in FIG. 3, FIG. 11 illustrates structures in FIG. 2 and FIG. 3 at the same time. As shown in FIG. 11, the row of the connecting portions 30 closest to the lower side of the non-touch area NA moves away from the non-touch area NA in the first direction X by a distance d1, and the maximum span of the normal first sub-electrode (for example, the third one of the first sub-electrodes) in the first direction X or the maximum length between two points on any side of the normal first sub-electrode is L1.

In some embodiments, before moving the row of the connecting portions 30 closest to the lower side of the non-touch area NA, as shown in FIGS. 3 and 11, centers of orthographic projections of each connecting portion 30 in the row of the connecting portions 30 on the substrate 100 are all located on a straight line extended in the second direction Y. After moving, as shown in FIG. 2 and FIG. 11, the centers of the orthographic projections of each connecting portion 30 in the row of the connecting portions 30 on the substrate 100 are still located on a straight line extended in the second direction Y. In other words, the row of the connecting portions translates as a whole during moving.

In some embodiments, a moved connecting portion 30 is on a straight line with the connecting portions in the first direction and the second direction, and areas of four electrodes most adjacent to the moved connecting portion are all smaller than an area of the normal first sub-electrode.

In some embodiments, a distance of the row of the connecting portions 30 closest to the lower side of the non-touch area NA moving away from the non-touch area NA in the first direction X is equal to ¼ of the maximum length of the normal first sub-electrode in the first direction X. That is to say, as shown in FIG. 2, the difference between the distance (which is between the center of the orthographic projection of the first connecting portion 301 on the substrate 100 and the center of the orthographic projection of the second connecting portion 302 on the substrate 100) and the distance (which is between the center of the orthographic projection of the second connecting portion 302 on the substrate 100 and the center of the orthographic projection of the third connecting portion 303 on the substrate 100) is less than or equal to ¼ of the maximum length of the third one of the first sub-electrodes 113 between the second connecting portion 302 and the third connecting portion 303 in the first direction.

In some embodiments, a distance of the row of the connecting portions 30 closest to the lower side of the non-touch area NA moving away from the non-touch area NA in the first direction X is less than or equal to about ¼ of the maximum span of the normal first sub-electrode in the first direction X or the maximum length between two points on any side of the normal first sub-electrode. The "about ¼" here refers to a value without strict limitation, which is within a range of allowable process and error measurement.

In some embodiments, as shown in FIG. 2, areas of the first one of the first sub-electrodes 111 and the second one of the first sub-electrodes 112 adjacent to the first connecting portion 301 both occupy about 50%-100% of an area of the third one of the first sub-electrodes 113 between the second connecting portion 302 and the third connecting portion 303, and the third one of the first sub-electrodes 113 is a normal first sub-electrode. Areas of two second sub-electrodes 21 adjacent to the first connecting portion 301 both occupy about 50%-100% of an area of one of two second sub-electrodes 21 (a normal second sub-electrode) adjacent to and electrically connected to the third connecting portion 303, and the one of the two second sub-electrodes is farther away from the non-touch area. Especially when the boundary area between the touch area and the non-touch area is arc-shaped, two second sub-electrodes 21 adjacent to and electrically connected to the third connecting portion 303 are generally at different distances from the non-touch area, the one second sub-electrode 21 farther from the non-touch area is generally closer to a center of the touch area (when the touch area is circular). The "about" here refers to a value without strict limitation, which is within the range of allowable process and error measurement.

In the related art, as shown in FIG. 3, areas of the first sub-electrodes numbered 1, 2, 3, and 4 are all equal to the area of the normal first sub-electrode. Areas of the first sub-electrodes numbered 5, 6, 7, and 8 are significantly smaller than the area of the normal first sub-electrode, and in particular, the areas of the first sub-electrodes numbered 5 and 8 are too small, which is less than 50% of the area of the normal first sub-electrode. In this way, the touch signal strength in the edge area of the touch area is small, the touch signal and the background noise signal may not be distinguished, and the digital roulette function may not be realized. A touch signal strength of a certain point in the touch panel is positively correlated with a variation in an analog detection capacitance value at the certain point, and the variation in the analog detection capacitance value may represent a variation in a capacitance signal at the certain point when a finger touches the certain point. In FIG. 3, a variation in an analog detection capacitance at point M is 0.0805 pF, and a variation in an analog detection capacitance at point N is 0.0348 pF.

In some embodiments of the present disclosure, as shown in FIG. 2, areas of the first sub-electrodes numbered 1-8 are all 50%-100% of the area of the normal first sub-electrode. For example, a distance of the row of the connecting portions 30 closest to the lower side of the non-touch area NA moving away from the non-touch area NA in the first direction X being equal to ¼ of the maximum length of the normal first sub-electrode in the first direction X is taken as an example. Specifically, the areas of the first sub-electrodes numbered 1, 2, 3, and 4 are all approximately equal to 75% of the area of the normal first sub-electrode. The areas of the first sub-electrodes numbered 5, 6, 7, and 8 are all greater than or equal to 50% of the area of the normal first sub-electrode. The areas of the first sub-electrodes numbered 6 and 7 are both approximately equal to 77.3% of the area of the normal first sub-electrode. At the same time, areas of the second sub-electrodes numbered 22, 23, and 24 are all greater than 75% of the area of the normal second sub-electrode. For example, the areas of the second sub-electrodes numbered 22 and 24 is approximately 85.4% of the area of the normal second sub-electrode, and the area of the second sub-electrode numbered 23 is approximately 86.4% of the area of the normal second sub-electrode. In FIG. 2, a variation in an analog detection capacitance at point M is 0.1323 pF, and a variation in an analog detection capacitance at point N is 0.0772 pF.

Compared with the related art, although the embodiment described above compresses the areas of the first sub-electrodes numbered 1, 2, 3, and 4, by adjusting the areas of the first sub-electrodes and the second sub-electrodes located in the edge area of the touch area, the area uniformities of the first sub-electrodes and the second sub-electrodes located in the edge area of the touch area are improved. Compared with related art, the variation in the analog detection capacitance at point M has increased by 1.64 times, and the variation in the analog detection capacitance at point N has increased by 2.21 times. In this way, the touch effect at the boundary area between the touch area and the non-touch area (that is, the edge area of the touch area) is improved, thereby the digital roulette function is realized.

As mentioned above, the touch panel provided by the embodiment shown in FIG. 2 may be modified on basis of the related technology shown in FIG. 3, the row of the connecting portions 30 closest to the lower side of the non-touch area NA moves away from the non-touch area NA in the first direction X, each connecting portion in the row of the connecting portions 30 moves a same distance away from the non-touch area NA in the first direction X. Those skilled in the art should understand that, in some embodiments, distances of each connecting portion 30 in the row of the connecting portions 30 moving away from the non-touch area NA in the first direction X may be different. Alternatively, in some embodiments, each connecting portion 30 in the row of connecting portions 30 moves away from the non-touch area NA in a direction at a certain angle with the first direction X, as long as the area uniformities of the first sub-electrodes and the second sub-electrodes in the edge area of the touch area is improved.

Figure 4:
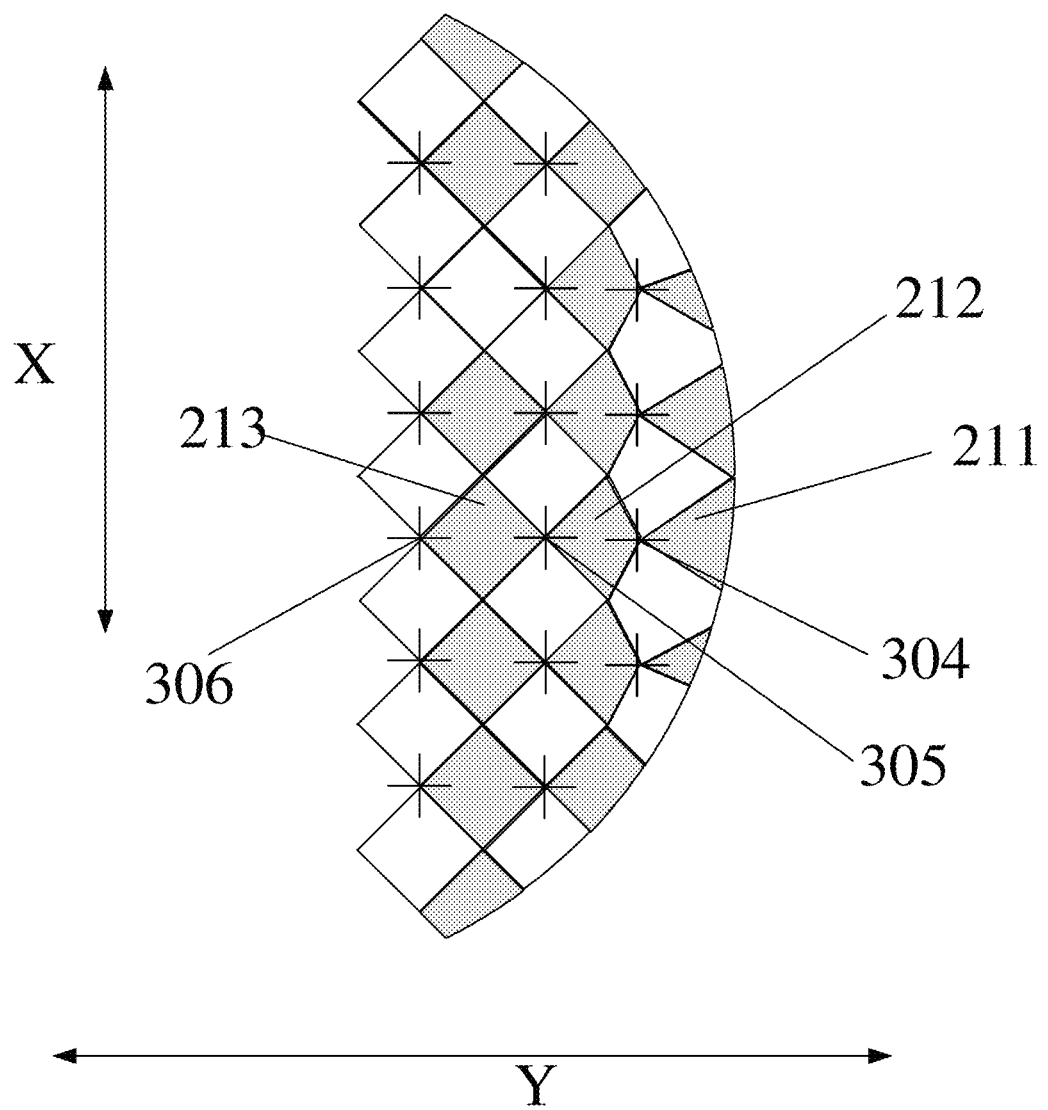
FIG. 4 is a schematic plan view of area B in FIG. 1.

FIG. 4 is a schematic plan view of area B in FIG. 1, FIG. 4 schematically illustrates a planar structure of a peripheral area of the touch panel, FIG. 4 only illustrates a part of the touch area TA, and the non-touch area NA is omitted. With reference to FIGS. 1 and 4 in conjunction, the touch area TA includes the edge area close to the non-touch area NA and the middle area surrounded by the edge area. The first sub-electrodes 11 and the second sub-electrodes 21 located in the middle area of the touch area TA are substantially regular patterns, such as rhombuses, squares, grid lines, etc. At least some of the first sub-electrodes 11 and the second sub-electrodes 21, especially the first sub-electrodes 11 and the second sub-electrodes 21 adjacent to the non-touch area NA located in the edge area of the touch area TA have irregular patterns.

As shown in FIGS. 1 and 4, the plurality of connecting portions 30 are substantially arranged in an array. A row of the connecting portions 30 extended in the second direction Y is taken as an example, the row of the connecting portions 30 includes a fourth connecting portion 304, a fifth connecting portion 305, and a sixth connecting portion 306 that are sequentially arranged away from the non-touch area NA in the second direction Y. The fourth connecting portion 304, the fifth connecting portion 305, and the sixth connecting portion 306 are sequentially adjacent to each other in the second direction Y.

It should be noted that the "the fourth connecting portion 304, the fifth connecting portion 305, and the sixth connecting portion 306 are sequentially adjacent to each other in the second direction Y" refers to that in the row of the connecting portions 30, the fourth connecting portion 304 and the fifth connecting portion 305 are adjacent and there is no other connecting portion between the fourth connecting portion 304 and the fifth connecting portion 305; the fifth connecting portion 305 and the sixth connecting portion 306 are adjacent and there is no other connecting portion between the fifth connecting portion 305 and the sixth connecting portion 306. In the embodiment, the fourth connecting portion 304 is a connecting portion in the row of the connecting portions 30 closest to a right side of the non-touch area NA.

The second touch electrodes 20 corresponding to the row of connecting portions 30 includes a first one of the second sub-electrodes 211, a second one of the second sub-electrodes 212 and a third one of the second sub-electrodes 213 that are sequentially arranged away from the non-touch area NA in the second direction Y, and the first one of the second sub-electrodes 211, the second one of the second sub-electrodes 212 and the third one of the second sub-electrodes 213 are sequentially adjacent to each other in the second direction Y. The first one of the second sub-electrodes 211 is adjacent to the non-touch area NA. The fourth connecting portion 304 is located between the first one of the second sub-electrodes 211 and the second one of the second sub-electrodes 212, and the fourth connecting portion 304 is electrically connected to both the first one of the second sub-electrodes 211 and the second one of the second sub-electrodes 212. The fifth connecting portion 305 is located between the second one of the second sub-electrodes 212 and the third one of the second sub-electrodes 213, and the fifth connecting portion 305 is electrically connected to both the second one of the second sub-electrodes 212 and the third one of the second sub-electrodes 213. The sixth connecting portion 306 is located on a side of the third one of the second sub-electrodes 213 away from the fifth connecting portion 305, and the sixth connecting portion 306 is electrically connected to the third one of the second sub-electrodes 213.

As shown in FIG. 4, a distance between a center of an orthographic projection of the fourth connecting portion 304 on the substrate 100 and a center of an orthographic projection of the fifth connecting portion 305 on the substrate 100 is less than a distance between the center of the orthographic projection of the fifth connecting portion 305 on the substrate 100 and a center of an orthographic projection of the sixth connecting portion 306 on the substrate 100.

A plurality of rows of the connecting portions 30 adjacent to the row of the connecting portions 30 and second touch electrodes 20 corresponding to the plurality of rows of the connecting portions 30 are all configured in a similar manner. In this way, areas of the second sub-electrodes of the second touch electrodes 20 adjacent to the non-touch area NA are significantly larger than those of the related art, a touch effect at a boundary area between the touch area and the non-touch area (that is, the edge area of the touch area) is improved, thereby the digital roulette function is realized.

Figure 5:
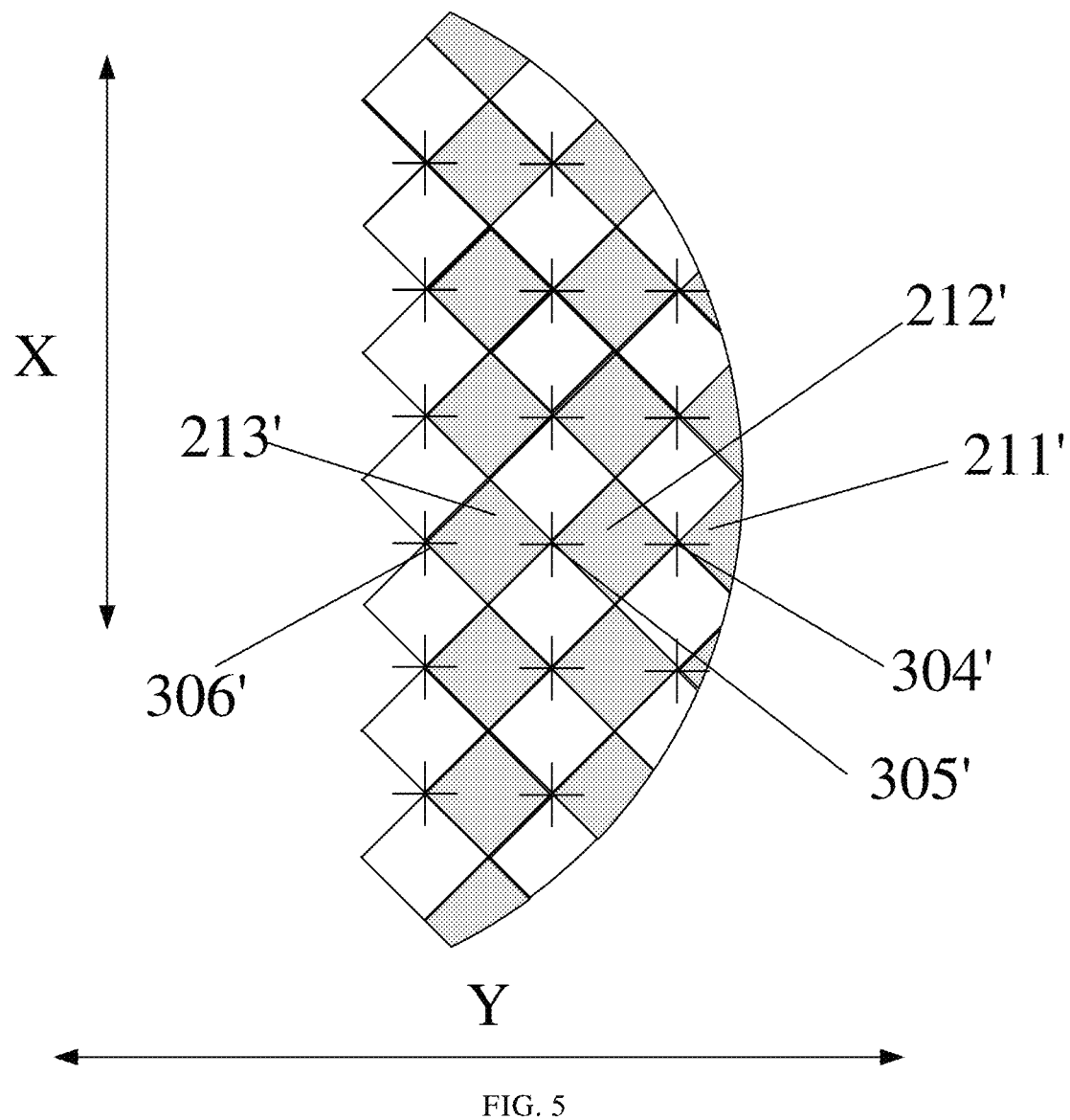
FIG. 5 is a schematic partial plan view of a touch panel in the related art.

FIG. 5 is a partial plan view of a touch panel in the related art, the structure in FIG. 5 corresponds to that in FIG. 4. As shown in FIGS. 1 and 5, a plurality of connecting portions 30 are substantially arranged in an array. A row of connecting portions 30 extended in the second direction Y is taken as an example, the row of the connecting portions 30 corresponds to the row of the connecting portions 30 illustrated in FIG. 4. The row of the connecting portions 30 includes a fourth connecting portion 304', a fifth connecting portion 305', and a sixth connecting portion 306' sequentially arranged away from the non-touch area NA in the second direction Y. The fourth connecting portion 304', the fifth connecting portion 305', and the sixth connecting portion 306' are sequentially adjacent to each other in the second direction Y. The fourth connecting portion 304', the fifth connecting portion 305' and the sixth connecting portion 306' in FIG. 5 correspond to the fourth connecting portion 304, the fifth connecting portion 305 and the sixth connecting portion 306 shown in FIG. 4, respectively.

The second touch electrodes 20 corresponding to the row of the connecting portions 30 includes a first one of second sub-electrodes 211', a second one of second sub-electrodes 212' and a third one of second sub-electrodes 213' sequentially arranged in the second direction Y away from the non-touch area. The first one of the second sub-electrodes 211', the second one of the second sub-electrodes 212' and the third one of the second sub-electrodes 113' are sequentially adjacent to each other in the second direction Y. The first one of the second sub-electrodes 211' is adjacent to the non-touch area NA. The fourth connecting portion 304' is located between the first one of the second sub-electrodes 211' and the second one of the second sub-electrodes 212', and the fourth connecting portion 304' is electrically connected to both the first one of the second sub-electrodes 211' and the second one of the second sub-electrodes 211'. The fifth connecting portion 302' is located between the second one of the second sub-electrodes 212' and the third one of the second sub-electrodes 213', and the fifth connecting portion 305' is electrically connected to both the second one of the second sub-electrodes 212' and the third one of the second sub-electrodes 213'. The sixth connecting portion 306' is located on a side of the third one of the second sub-electrodes 213' away from the fifth connecting portion 305', and the sixth connecting portion 306' is electrically connected to the third one of the second sub-electrodes 213'. The first one of the second sub-electrodes 211', the second one of the second sub-electrodes 212', and the third one of the second sub-electrodes 213' shown in FIG. 5 correspond to the first one of the second sub-electrodes 211, the second one of the second sub-electrodes 212 and the third one of the second sub-electrodes 213 shown in FIG. 4, respectively.

As shown in FIG. 5, a distance between a center of an orthographic projection of the fourth connecting portion 304' on the substrate 100 and a center of an orthographic projection of the fifth connecting portion 305' on the substrate 100 is equal to a distance between the center of the orthographic projection of the fifth connecting portion 305' on the substrate 100 and a center of an orthographic projection of the sixth connecting portion 306' on the substrate 100. In FIG. 5, a plurality of rows of the connecting portions 30 adjacent to the row of the connecting portions 30 and second touch electrodes 20 corresponding to the plurality of rows of the connecting portions 30 are all configured in a similar manner. As shown in FIG. 5, in the related art, areas of the second sub-electrodes 21 at a boundary area between the touch area TA and the non-touch area NA are small, and areas of some of the second sub-electrodes 21 are less than or equal to 50% of an area of a normal sub-electrode. The normal sub-electrode here refers to a first sub-electrode (also referred to as a normal first sub-electrode)/or a second sub-electrode (also referred to as a normal second sub-electrode), which are located in the middle area of the touch area TA and substantially have regular patterns, such as rhombuses, squares, grid lines, etc. In the related art, areas of some of the first sub-electrodes and/or the second sub-electrodes located at the boundary area between the touch area TA and the non-touch area NA are too small, resulting in a low touch signal strength in the edge area of the touch area, so that a touch signal and a background noise signal may not be distinguished, and the digital roulette function may not be realized.

In order to facilitate understanding, the touch panel provided in the embodiment shown in FIG. 4 may be modified on basis of the related technology shown in FIG. 5, a column of the connecting portions 30 closest to a right side of the non-touch area NA moves away from the non-touch area NA in the second direction Y, and shapes of the first sub-electrodes and the second sub-electrodes connected to each connecting portion 30 in the column of the connecting portions 30 are adjusted accordingly. In this way, areas of the first sub-electrode and/or the second sub-electrode located at the boundary area between the touch area TA and the non-touch area NA have a great relative uniformity, so as to avoid the area from being too small and a touch effect at the boundary area between the touch area and the non-touch area (that is, the edge area of the touch area) is improved, thereby the digital roulette function is realized.

A distance of the entire column of the connecting portions 30 closest to the right side of the non-touch area NA moving away from the non-touch area NA in the second direction Y is less than or equal to ½ of a maximum span of the normal second sub-electrode in the second direction Y or a maximum length between two points on any side of the normal second sub-electrode (hereinafter referred to as a maximum length in the second direction Y). That is to say, a difference between the distance (which is between the center of the orthographic projection of the fourth connecting portion 304 on the substrate 100 and the center of the orthographic projection of the fifth connecting portion 305 on the substrate 100) and the distance (which is between the center of the orthographic projection of the fifth connecting portion 305 on the substrate 100 and the center of the orthographic projection of the sixth connecting portion 306 on the substrate 100) is less than or equal to ½ of a maximum length of the third one of the second sub-electrodes 213 between the fifth connecting portion 305 and the sixth connecting portion 306 in the second direction Y (i.e. a length of a diagonal line of the third one of the second sub-electrodes 213 in the second direction). In some embodiments, the distance of the column of the connecting portions 30 closest to the right side of the non-touch area NA moving away from the non-touch area NA is less than or equal to about ½ of the maximum span of the normal second sub-electrode in the second direction Y or the maximum length between two points on any side of the normal second sub-electrode. The "about ½" here refers to a value without strict limitation, which is within a range of allowable process and error measurement.

At this time, areas of the first sub-electrodes and/or the second sub-electrodes located at the boundary area between the touch area TA and the non-touch area NA have a good relative uniformity, and a distance between any two adjacent connecting portions 30 may be prevented from being too small. A connecting portion 30 in the touch panel generally includes a metal bridge. A light transmittance of the metal bridge is almost zero due to a material property of the metal bridge. If a distance between two adjacent connecting portions 30 is too small, two metal bridges of the two adjacent connecting portions will be connected together visually. When the touch panel is applied to an electronic device including a touch screen, black dot outlines appears on the touch screen, which seriously affects display of the screen.

Figure 12:
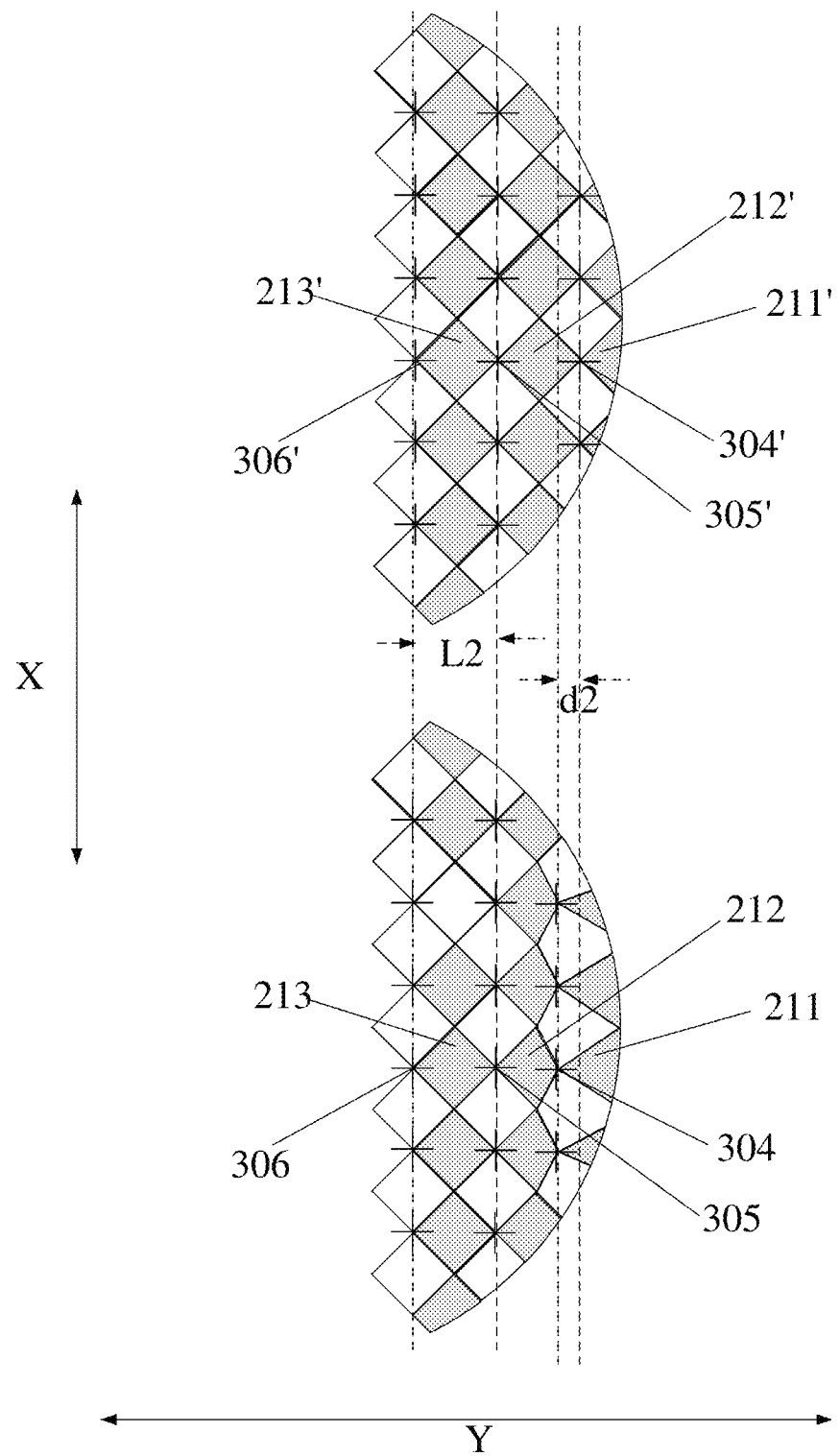
FIG. 12 is a comparison schematic diagram of the structures shown in FIG. 4 and FIG. 5.

In order to clearly reflect a position change of the column of the connecting portions 30 closest to the right side of the non-touch area NA in FIG. 4 relative to that in the related art in FIG. 5, FIG. 12 illustrates structures in FIG. 4 and FIG. 5 at the same time. As shown in FIG. 12, the column of the connecting portions 30 closest to the right side of the non-touch area NA moves away from the non-touch area NA in the second direction Y by a distance d2, and the maximum span of the normal second sub-electrode (for example, the third one of the second sub-electrodes) in the second direction Y or the maximum length between two points on any side of the normal second sub-electrode is L2.

In some embodiments, before moving the column of the connecting portions 30 closest to the right side of the non-touch area NA, as shown in FIGS. 5 and 12, centers of orthographic projections of each connecting portion 30 in the column of the connecting portions 30 on the substrate 100 is located on a straight line extended in the second direction Y. After moving, as shown in FIG. 4 and FIG. 12, the centers of the orthographic projections of each connecting portion 30 in the column of the connecting portions 30 on the substrate 100 are still located on a straight line extended in the second direction Y. In other words, the column of the connecting portions translates as a whole during moving.

In some embodiments, a moved connecting portion 30 is on a straight line with the connecting portions in the first direction and the second direction, and areas of four electrodes most adjacent to the moved connecting portion are all smaller than an area of the normal first sub-electrode.

In some embodiments, a distance of the column of the connecting portions 30 closest to the right side of the non-touch area NA moving away from the non-touch area NA in the second direction Y is equal to ¼ of a maximum length of the normal second sub-electrode in the second direction Y. That is to say, as shown in FIG. 4, the difference between the distance (which is between the center of the orthographic projection of the fourth connecting portion 304 on the substrate 100 and the center of the orthographic projection of the fifth connecting portion 305 on the substrate 100) and the distance (which is between the center of the orthographic projection of the fourth connecting portion 304 on the substrate 100 and the center of the orthographic projection of the sixth connecting portion 306 on the substrate 100) is less than or equal to ¼ of the maximum length of the third one of the second sub-electrodes 213 between the fifth connecting portion 305 and the sixth connecting portion 306 in the second direction Y.

In some embodiments, as shown in FIG. 4, areas of the first one of the second sub-electrodes 211 and the second one of the second sub-electrodes 212 adjacent to the fourth connecting portion 304 both occupy about 50%-100% of an area of the third one of the second sub-electrodes 213 between the fifth connecting portion 305 and the sixth connecting portion 306, and the third one of the second sub-electrodes 213 is a normal second sub-electrode. Area of two first sub-electrodes 11 adjacent to the fourth connecting portion 304 both occupy both occupy 50%-100% of an area of one of two first sub-electrodes 11 (a normal first sub-electrode) adjacent to and electrically connected to the sixth connecting portion 306, and the one of the two first sub-electrode is farther away from the non-touch area. Especially when the boundary area between the touch area and the non-touch area is arc-shaped, two first sub-electrodes 11 adjacent to and electrically connected to the sixth connecting portion 306 are generally at different distances from the non-touch area, the one first sub-electrode 11 farther from the non-touch area is generally closer to the center of the touch area (when the touch area is circular).

As mentioned above, the touch panel provided in the embodiment shown in FIG. 4 may be modified on basis of the related technology shown in FIG. 5, the entire column of the connecting portions 30 closest to the right side of the non-touch area NA moves away from the non-touch area NA in the second direction Y, each connecting portions in the column of the connecting portions 30 moves a same distance away from the non-touch area NA in the second direction Y. Those skilled in the art should understand that, in some embodiments, distances of each connecting portion 30 in the column of the connecting portions 30 moving away from the non-touch area NA in the second direction Y may be different. Alternatively, in some embodiments, each connecting portion 30 in the column of the connecting portions 30 moves away from the non-touch area NA in a direction at a certain angle with the second direction Y, as long as the area uniformities of the first sub-electrodes and the second sub-electrodes in the edge area of the touch area is improved.

A specific structure of C area in FIG. 1 is similar to a specific structure of B area, and the C area and the B area are approximately mirror-symmetrical with respect to an axis of the touch panel in the first direction X, which will not be repeated here. A specific structure of D area in FIG. 1 is similar to a specific structure of A area, and the D area and the A area are approximately mirror-symmetrical with respect to an axis of the touch panel in the second direction Y, which will not be repeated here.

Compared to the related art, by adjusting the areas of the first sub-electrodes and the second sub-electrodes located in the edge area of the touch area, the area uniformities of the first sub-electrodes and the second sub-electrodes in the edge area of the touch area are improved, and the touch effect at the boundary area between the touch area and the non-touch area (that is, the edge area of the touch area) is improved, thereby the digital roulette function is realized.

In the above-mentioned embodiments, the boundary area between the touch area TA and the non-touch area NA is circular. Those skilled in the art should understand that in other embodiments, the boundary area between the touch area TA and the non-touch area NA may be circular or other shapes, such as an ellipse. Furthermore, as long as at least a part of the boundary area between the touch area TA and the non-touch area NA is arc-shaped, or the area uniformities of the first sub-electrodes and/or the second sub-electrodes located at the boundary area between the touch area TA and the non-touch area NA is poor, the design concept of the present disclosure may be adopted. By moving at least one connecting portion adjacent to the boundary area between the touch area TA and the non-touch area NA in the direction away from the non-touch area NA, and then adjusting the areas of the first sub-electrodes and/or the second sub-electrodes connected to the connecting portion, thereby improving the area uniformities of the first sub-electrodes and/or the second sub-electrodes at the boundary area between the touch area TA and the non-touch area NA, improving the touch effect at the boundary area between the touch area and the non-touch area (that is, the edge area of the touch area), and thereby realizing the digital roulette function.

Figure 6:
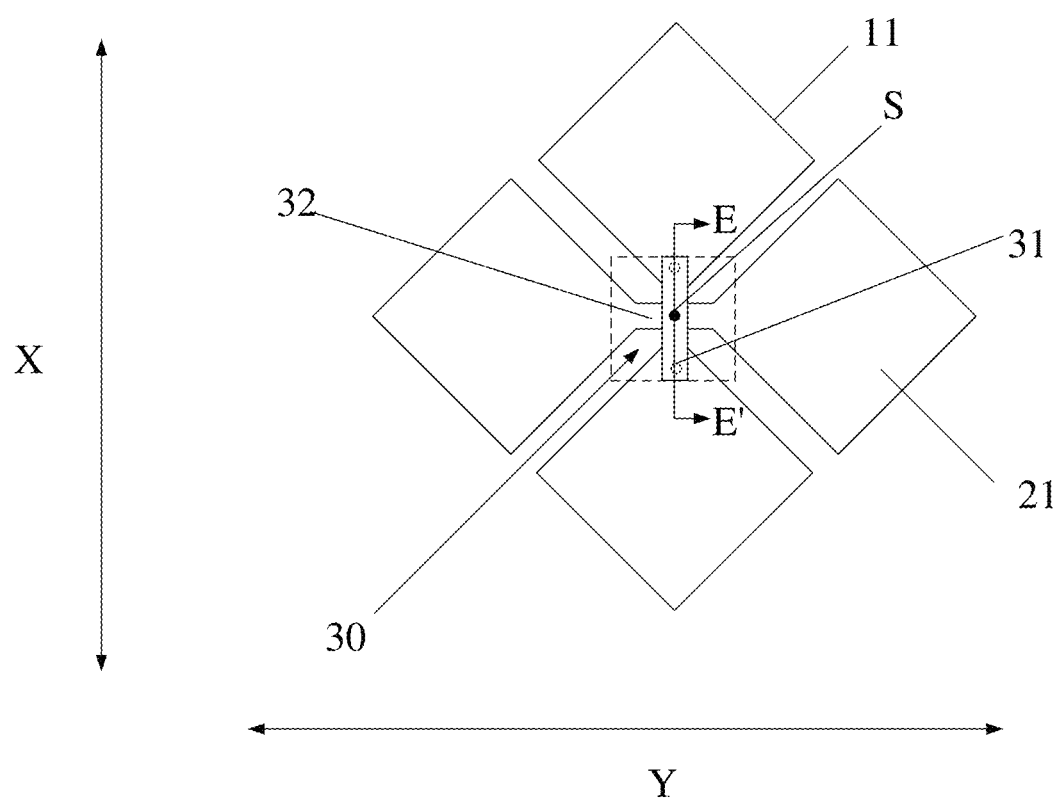
FIG. 6 is a partial enlarged schematic diagram of a touch panel according to some embodiments of the present disclosure.

FIG. 6 is a partial enlarged schematic view of the touch panel in FIG. 1, and FIG. 6 illustrates a connecting portion and two first sub-electrodes and two second sub-electrodes adjacent to electrically connected to the connecting portion. The two first sub-electrodes are both normal first sub-electrodes, and the two second sub-electrodes are both normal second sub-electrodes.

Figure 7:
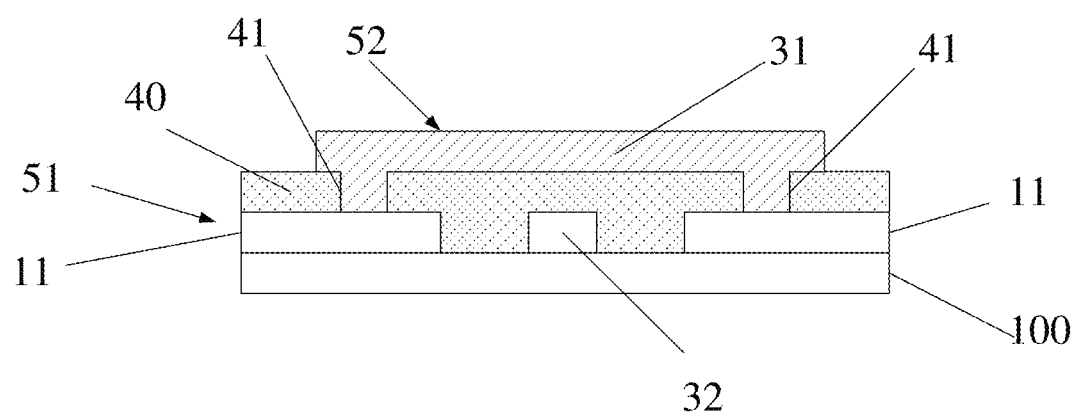
FIG. 7 is a schematic cross-sectional view along line E-E' of the structure in FIG. 6.

As shown in FIG. 6, the connecting portion 30 includes a first connecting sub-portion 31 and a second connecting sub-portion 32. The first connecting sub-portion 31 extends in the first direction X and electrically connects the two first sub-electrodes 11 adjacent to each other in the first direction X. The second connecting sub-portion 32 extends in the second direction Y and electrically connects the two second sub-electrodes 21 adjacent to each other in the second direction Y. The first connecting sub-portion 31 and the second connecting sub-portion 32 are electrically insulated from each other, and an insulating layer is provided between the first connecting sub-portion 31 and the second connecting sub-portion 32. Herein, the above-mentioned connecting portion 30 may be regarded as a regular area where the the first connecting sub-portion 31 and the second connecting sub-portion 32 are stacked. FIG. 7 is a schematic cross-sectional view of the structure in FIG. 6 along line E-E'. As shown in FIGS. 6 and 7, the first sub-electrodes 11 and the second sub-electrodes 21 are all located on a same electrode layer, labeled as a first electrode layer 51, and the first electrode layer 51 is provided on the substrate 100. The second connecting sub-portion 32 and the two second sub-electrodes 21 adjacent to each other in the second direction Y are an integral structure, that is, the second connecting sub-portion 32 is located on the first electrode layer 51, as well. The second connecting sub-portion 32 is provided on the same layer with the first touch electrode 10 including the first sub-electrode 11 and the second touch electrode 20 including the second sub-electrode 21. The first connecting sub-portion 31 is located on a second electrode layer 52. The second electrode layer 52 is located on a side of the first electrode layer 51 away from the substrate 100, and an insulating layer 40 is provided between the first electrode layer 51 and the second electrode layer 52. A via hole 41 is provided in the insulating layer 40. One end portion of the first connecting sub-portion 31 is electrically connected to one first sub-electrode 11 through the via hole 41, the other end portion of the first connecting sub-portion 31 is electrically connected to the other one first sub-electrode 11 through the via 41, so that the two first sub-electrodes 11 are electrically connected by means of a bridge connection.

Figure 8:
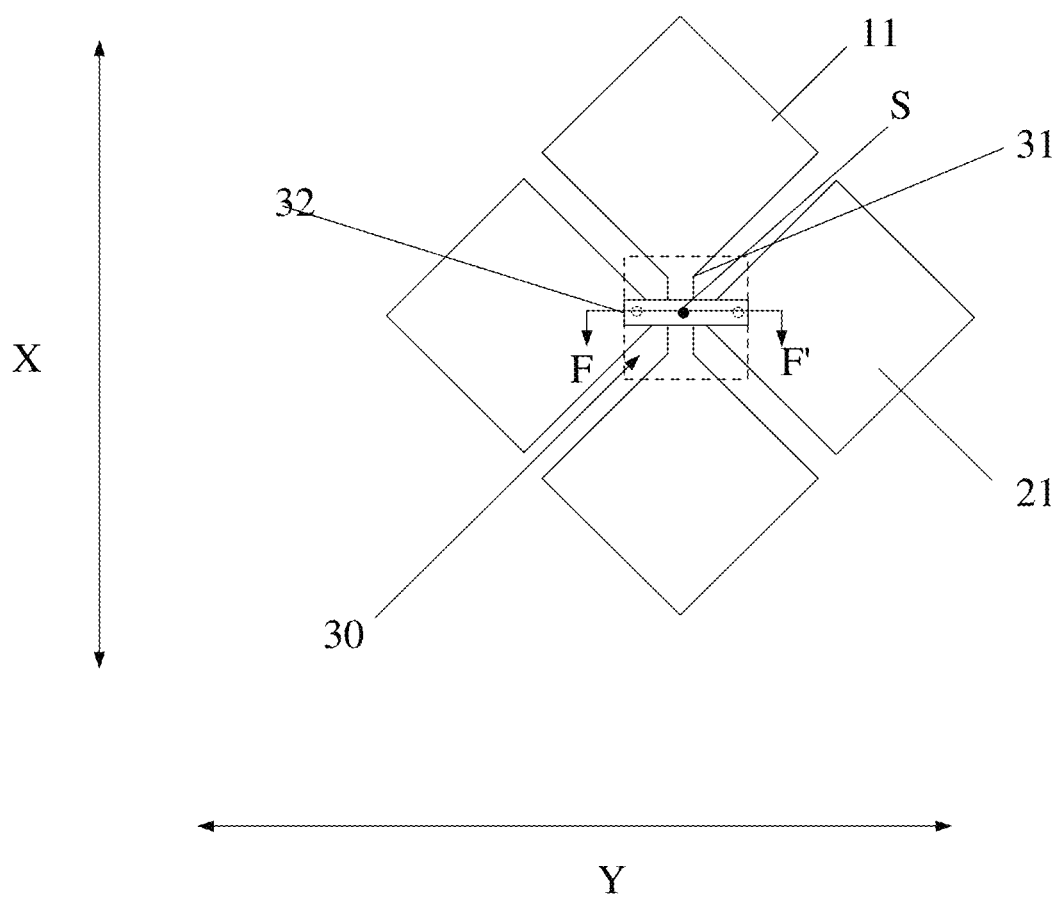
FIG. 8 is a partial enlarged schematic diagram of a touch panel according to some embodiments of the present disclosure.

FIG. 8 is a partial enlarged schematic view of the touch panel in FIG. 1, and FIG. 8 illustrates a connecting portion, two first sub-electrodes and two second sub-electrodes. The two first sub-electrodes are adjacent to the connecting portion and electrically connected to each other, and the two second sub-electrodes are adjacent to the connecting portion and electrically connected to each other. The two first sub-electrodes are both normal first sub-electrodes, and the two second sub-electrodes are both normal second sub-electrodes.

As shown in FIG. 8, the connecting portion 30 includes a first connecting sub-portion 31 and a second connecting sub-portion 32. The first connecting sub-portion 31 extends in the first direction X and electrically connects the two first sub-electrodes 11 adjacent to each other in the first direction X. The second connecting sub-portion 32 extends in the second direction Y and electrically connects the two second sub-electrodes 21 adjacent to each other in the second direction Y. The first connecting sub-portion 31 and the second connecting sub-portion 32 are electrically insulated from each other, and an insulating layer is provided between the first connecting sub-portion 31 and the second connecting sub-portion 32.

Figure 9:
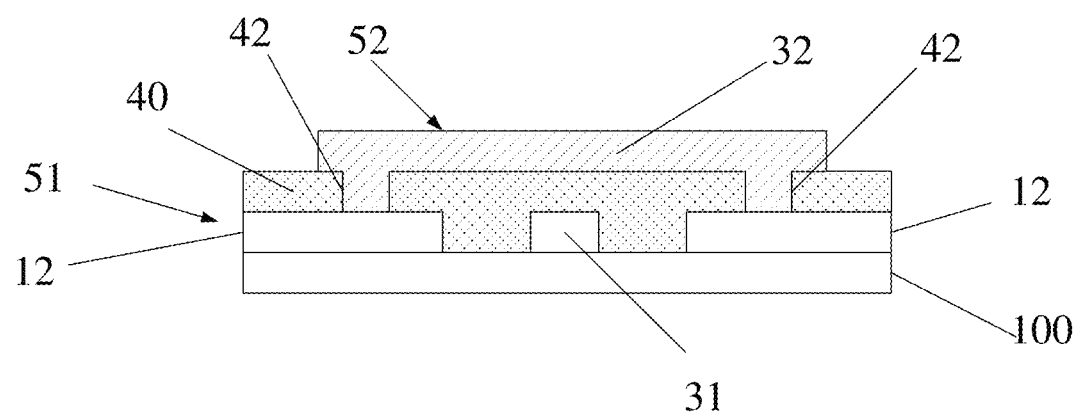
FIG. 9 is a schematic cross-sectional view along line E-E' of the structure in FIG. 8.

FIG. 9 is a schematic cross-sectional view of the structure in FIG. 8 along line F-F'. As shown in FIGS. 8 and 9, the first sub-electrode 11 and the second sub-electrode 21 are both located on a same layer, labeled as a first electrode layer 51, and the first electrode layer 51 is provided on the substrate 100. The first connecting sub-portion 31 and the two first sub-electrodes 11 adjacent to each other in the first direction X are an integral structure, that is, the first connecting sub-portion 31 is located on the first electrode layer 51, as well. The first connecting sub-portion 31 is provided on the same layer as the first touch electrode 10 including the first sub-electrode 11 and the second touch electrode 20 including the second sub-electrode 21. The second connecting sub-portion 32 is located on a second electrode layer 52. The second electrode layer 52 is located on a side of the first electrode layer 51 away from the substrate 100, and an insulating layer 40 is provided between the first electrode layer 51 and the second electrode layer 52. A via hole 42 is provided in the insulating layer 40. One end portion of the second connecting sub-portion 32 is electrically connected to one second sub-electrode 21 through the via hole 42, the other end portion of the second connecting sub-portion 32 is electrically connected to the other one second sub-electrode 21 through the via 42, so that the two second sub-electrodes 21 are electrically connected by means of a bridge connection.

The connecting portion 30 herein refers to a part represented by a dashed frame in FIG. 6 or FIG. 8, and the connecting portion 30 includes a stacked structure composed of the first connecting sub-portion 31 and the second connecting sub-portion 32. A center of an orthographic projection of the connecting portion 30 on the substrate 100 is represented by S in FIG. 6 or FIG. 8, that is, the center of the dashed frame in FIG. 6 or FIG. 8. A location of the center S may be used to indicate a location of the connecting portion 30. Those skilled in the art should understand that in FIGS. 1-5, for convenience of drawing, only "+" is used to indicate the connecting portion 30, and a center of "+" is used to indicate the center S of the orthographic projection of the connecting portion 30 on the substrate 100.

In some embodiments, there may be one or more first connecting sub-portions 31 in the connecting portion 30, and there may be one or more second connecting sub-portions 32 in the connecting portion 30, as well. In FIGS. 6 and 8, only an example in which there is the connecting portion 30 is provided with only one first connecting sub-portion 31 and one second connecting sub-portion 32 is shown.

Figure 10:
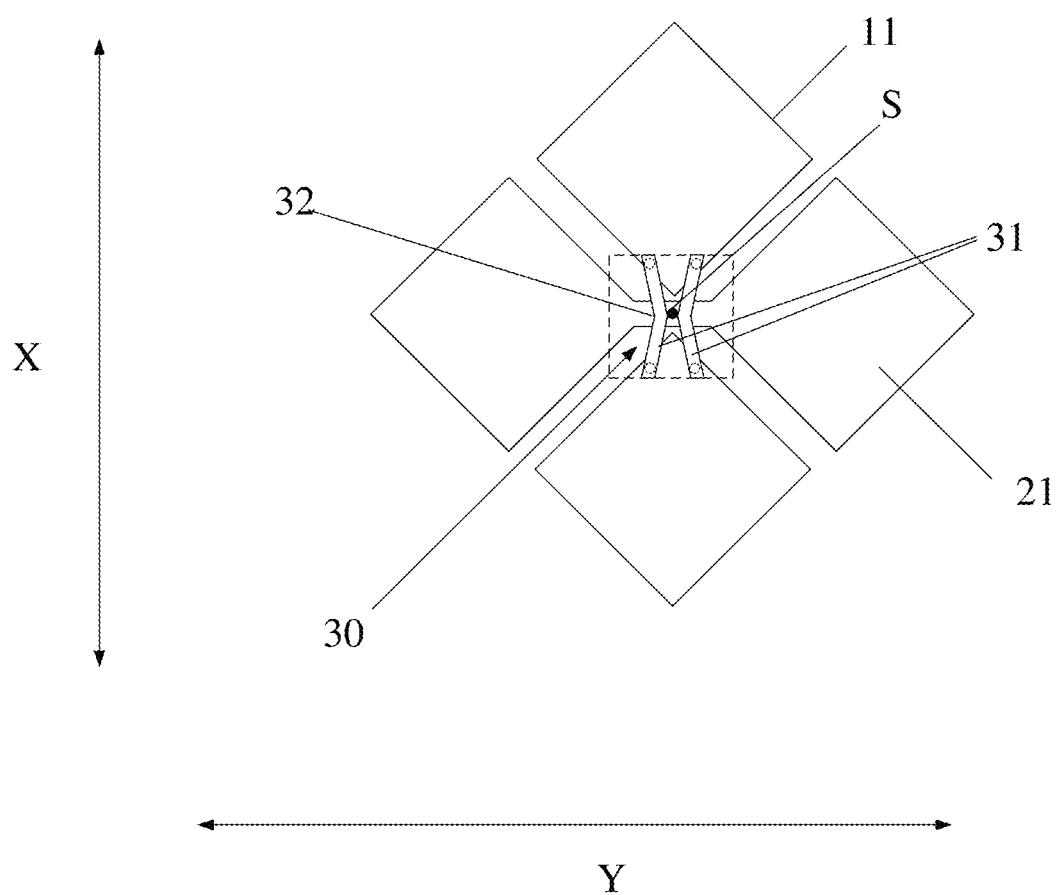
FIG. 10 is a partial enlarged schematic diagram of a touch panel according to some embodiments of the present disclosure.

FIG. 10 is a partial enlarged schematic diagram of a touch panel according to some embodiments of the present disclosure. As shown in FIG. 10, a connecting portion 30 includes two first connecting sub-portions 31 and one second connecting sub-portion 32. Compared with the structure shown in FIG. 6, one first connecting sub-portion 31 is added to the structure shown in FIG. 10. a layer where the first connecting sub-portion 31 is located and a connection relationship and connection manner with two adjacent first sub-electrodes 11 are substantially the same as those in FIG. 6 and will not be repeated here.

Figure 15:
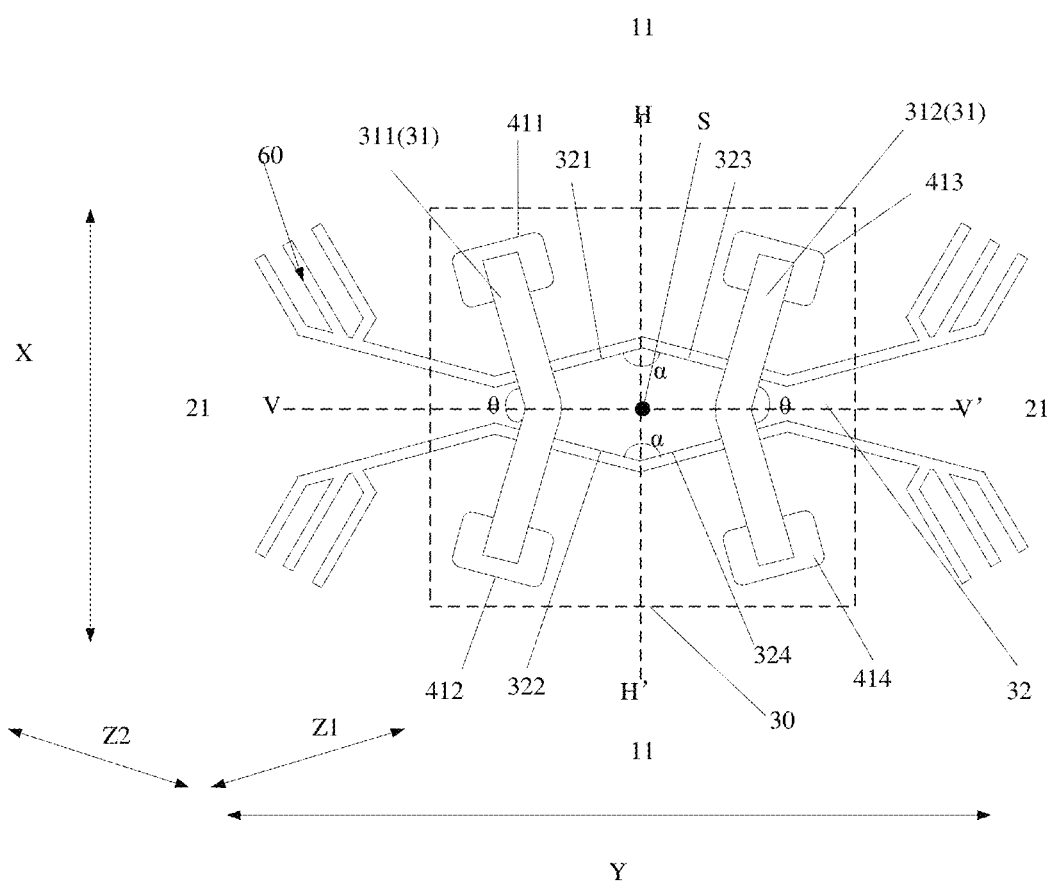
FIG. 15 is a partial enlarged schematic diagram of a touch panel according to some embodiments of the present disclosure.

In some embodiments, as shown in FIGS. 10 and 15, the connecting portion 30 is a rectangle shown by a dashed frame. In some embodiments, a length of the connecting portion 30 in the second direction Y is greater than a length of the connecting portion 30 in the first direction X. In some embodiments, a length of the connecting portion 30 in the second direction Y is less than or equal to a length of the connecting portion 30 in the first direction X. In some embodiments, a length of the connecting portion 30 in the second direction Y is about 0.6 mm, and a length the connecting portion 30 in the first direction X is 0.55 mm. In some other embodiments, a length of the connecting portion 30 in the second direction Y ranges from about 0.5 to 0.7 mm, and a length of the connecting portion 30 in the first direction X ranges from about 0.45 to 0.65 mm. The "about" here refers to a value without strict limitation, which is within a range of allowable process and error measurement.

Those skilled in the art should understand that the first connecting sub-portion 31 and/or the second connecting sub-portion 32 may be in a shape of a straight strip (as shown in FIGS. 6 and 8), a bent strip (as shown in FIG. 10), a curved strip, etc., as long as the two first sub-electrodes or two second sub-electrodes electrically connected thereto are electrically connected, which is not specifically limited here.

In some embodiments, a maximum length of the first connecting sub-portion 31 in the first direction X is equal to about ¼ of a maximum length of a normal first sub-electrode in the first direction X, for example, the normal first sub-electrode may be the third one of the first sub-electrodes 113 between the second connecting portion 302 and the third connecting portion 303 shown in FIG. 2. A maximum length of the second connecting sub-portion 31 in the first direction X is equal to about ¼ of a maximum length of a normal second sub-electrode in the first direction X, for example, the normal second sub-electrode may be the third one of the second sub-electrodes 213 between the fifth connecting portion 305 and the sixth connecting portion 306 shown in FIG. 5. The "about" refers to a value without strict limitation, which is within an range of allowable process and error measurement.

In some embodiments, a maximum length of a normal first sub-electrode in the first direction X and a maximum length of a normal second sub-electrode in the second direction Y may be equal or different.

In the above-mentioned embodiments, adjacent first sub-electrodes 11 and second sub-electrodes 21 with linear boundaries are illustrated. However, in some embodiments, first sub-electrodes 11 and second sub-electrodes 21 may have boundaries of other shapes, for example, a polyline shape. Hereinafter, a boundary between a first sub-electrode labeled 6 and a second sub-electrode 21 labeled 22 in FIG. 2 is taken as an example for illustration.

Figure 13:
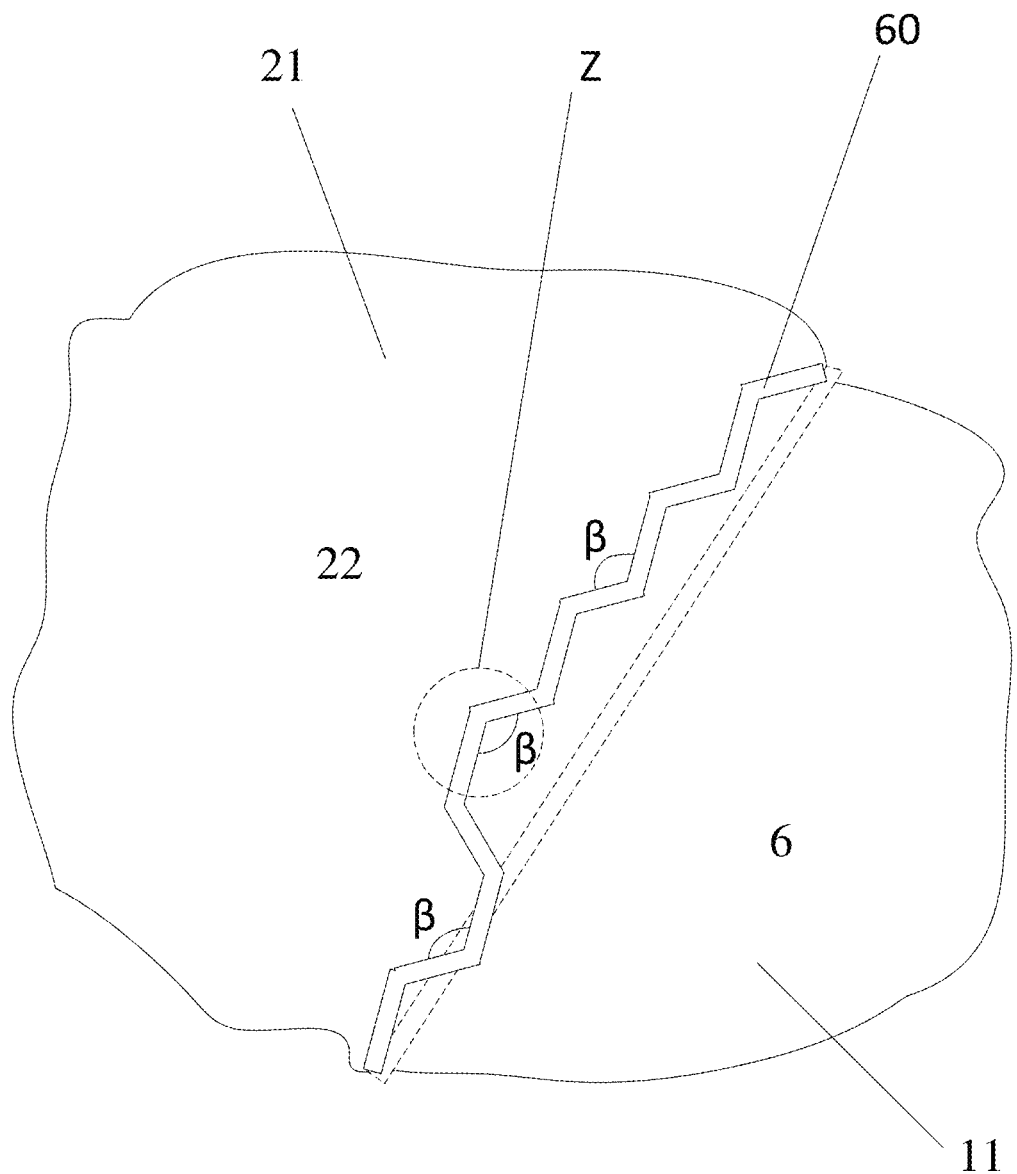
FIG. 13 is a partial enlarged schematic diagram of a touch panel according to some embodiments of the present disclosure.

FIG. 13 is a partial enlarged schematic view of a touch panel according to some embodiments of the present disclosure. FIG. 13 only illustrates a part of the first sub-electrode 11 labeled 6 and a part of the second sub-electrode 21 labeled 22, and a boundary between the first sub-electrode 11 and the second sub-electrode 21. As shown in FIG. 13, the boundary 60 between the first sub-electrode 11 and the second sub-electrode 21 is in a shape of a polyline. The boundary 60 includes a plurality of polylines connected end to end, any two adjacent polylines form an obtuse angle β, and a range of the obtuse angle β is 120°~140°. For example, the obtuse angle β between any two adjacent polylines is 130°. Compared with a case where the boundary between the first sub-electrode 11 and the second sub-electrode 21 is linear (a dashed line in FIG. 13 illustrates a linear boundary), such arrangement may further adjust sizes of the first sub-electrode 11 and the second sub-electrode 21 adjacent to each other. As shown in FIGS. 2 and 13, such arrangement may further increase a size of the first sub-electrode 11 labeled 6 and reduce a size of the second sub-electrode 21 labeled 22, so that the sizes of the first sub-electrode 11 and the second sub-electrode 21 are further balanced. In some embodiments, the boundary 60 between the first sub-electrode 11 and the second sub-electrode 21 is in a shape of a polyline, and the boundary 60 includes a plurality of polylines connected end to end, and any two adjacent polylines form an obtuse angle β, and a range of the obtuse angle β is 120°~140°, and at least two obtuse angles have different values.

Figure 14:
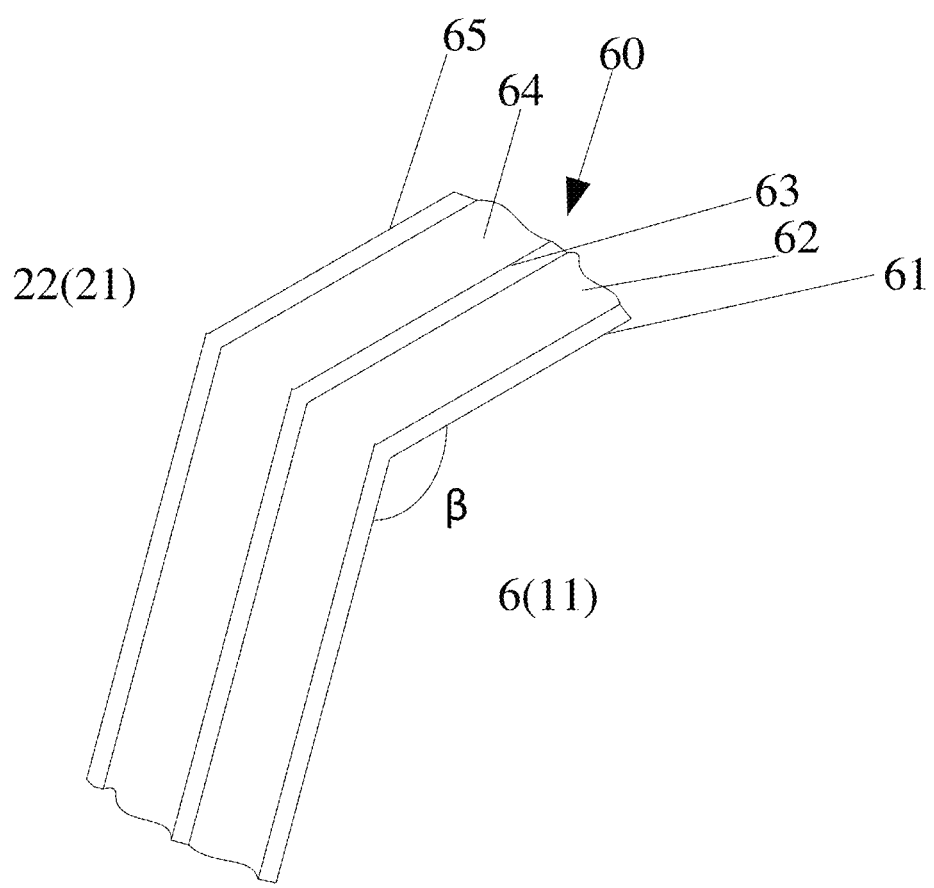
FIG. 14 is an enlarged schematic diagram of area Z in FIG. 13.

FIG. 14 is an enlarged schematic diagram of area Z in FIG. 13. As shown in FIG. 14, the boundary 60 between the first sub-electrode 11 labeled 6 and the second sub-electrode 21 labeled 22 includes a first dummy electrode 62 and a second dummy electrode 64 located between the first sub-electrode 11 and the second sub-electrode 21. The first dummy electrode 62 and the second dummy electrode 64 are both in a shape of a polyline, and the first dummy electrode 62 and the second dummy electrode 64 are arranged substantially in parallel. The "the first dummy electrode 62 and the second dummy electrode 64 are arranged substantially in parallel" means that both the first dummy electrode 62 and the second dummy electrode 64 include a plurality of polylines, each polyline of the first dummy electrode 62 is arranged in parallel with a polyline corresponding to the second dummy electrode 64, and the first dummy electrode 62 is closer to the first sub-electrode 11 than the second dummy electrode 64, and the second dummy electrode 64 is closer to the second sub-electrode 21 than the first dummy electrode 62. The boundary 60 also includes a first gap 61 between the first sub-electrode 11 and the first dummy electrode 62, a second gap 63 between the first dummy electrode 62 and the second dummy electrode 64, and a third gap 65 between the second dummy electrode 64 and the second sub-electrode 21. The first gap 61 electrically insulates the first sub-electrode 11 from the first dummy electrode 62, the second gap 63 electrically insulates the first dummy electrode 62 from the second dummy electrode 64, and the third gap 65 electrically insulates the second dummy electrode 64 from the second sub-electrode 21. The first gap 61, the second gap 63 and the third gap 65 are all in a shape of a polyline, and the first gap 61, the second gap 63 and the third gap 65 are arranged substantially in parallel.

In some embodiments, both the first dummy electrode 62 and the second dummy electrode 64 are in a floating state.

In some embodiments, the first dummy electrode 62, the second dummy electrode 64, the first sub-electrode 11, and the second sub-electrode 21 are provided on the same layer with the same material. Such arrangement may make a transmittance of an area where the first sub-electrode 11 and the second sub-electrode 21 are located as close as possible to an area where the boundary 60 is located, so that a transmittance of the entire touch panel is as uniform as possible.

Those skilled in the art should understand that, a boundary between any two adjacent first sub-electrode 11 and second sub-electrode 21 may be configured as mentioned above.

FIG. 15 illustrates a partial enlarged schematic diagram of a touch panel according to some embodiments of the present disclosure. FIG. 15 mainly illustrates a specific structure of a connecting portion 30 and a structure around the connecting portion. The connecting portion 30 is a part represented by a dashed frame in FIG. 15, the connecting portion 30 includes a stacked structure composed of first connecting sub-portions 31 and a second connecting sub-portion 32, and the connecting portion 30 is a regular area where the stacked structure is located. Similar to the connecting portion 30 shown in FIG. 10, the connecting portion 30 in FIG. 15 includes two first connecting sub-portions 31 (ie, a first one of the first connecting sub-portions 311 and a second one of the first connecting sub-portions 312), one second connecting sub-portion 32, a first via hole 411 and a second via hole 412 respectively electrically connected to both end portions of the first one of the first connecting sub-portions 311, and a third via hole 413 and a fourth via vole 414 respectively electrically connected to both end portions of the second one of the first connecting sub-portions 312. Herein, the connecting portion may be a regular area (for example, with a rectangular shape or other shapes), and a center of an orthographic projection of the connecting portion on the substrate may be a center of an orthographic projection of the regular area on the substrate.

As shown in FIG. 15, the connecting portion 30 connects a first sub-electrode 11 on an upper side and a first sub-electrode 11 on a lower side, and the connecting portion 30 connects a second sub-electrode 21 on a left side and a second sub-electrode 21 on a right side. A boundary 60 between any adjacent first sub-electrode 11 and second sub-electrode 21 is in a shape of a polyline, which is similar to the boundary shown in FIG. 13. FIG. 15 only shows a part of the boundary 60 close to the connecting portion 30.

In some embodiments, in FIG. 15, the first sub-electrode 11 on the upper side, the first sub-electrode 11 on the lower side, the second sub-electrode 21 on the left side and the second sub-electrode 21 on the right side are all provided on a same layer and are made of the same material, for example, similar to the embodiments shown in FIGS. 6 and 7, they are all located on a first electrode layer 51. The second connecting sub-portion 32 is integrally formed with the second sub-electrode 21 on the left side and the second sub-electrode 21 on the right side, for example, on the first electrode layer 51, as well. The first one of the first connecting sub-portions 311 and the second one of the first connecting sub-portions 312 are both located on a second electrode layer 52, for example, which is similar to the embodiments shown in FIGS. 6 and 7. An insulating layer 40 is provided between the first electrode layer 51 and the second electrode layer 52. The insulating layer 40 is provided with a first via hole 411, a second via hole 412, a third via hole 413 and a fourth via hole 414. As shown in FIG. 15, an upper end portion of the first one of the first connecting sub-portions 311 is electrically connected to first sub-electrode 11 on the upper side through the first via hole 411, a lower end of portion of the first one of the first connecting sub-portions 311 is electrically connected to first sub-electrode 11 on the lower side through the second via hole 412; an upper end portion of the second one of the first connecting sub-portions 312 is electrically connected to the first sub-electrode 11 on the upper side through the third via hole 413, and a lower end portion of the second one of the first connecting sub-portions 312 is electrically connected to the first sub-electrode 11 on the lower side through the fourth via hole 414.

In some embodiments, the first via hole 411, the second via hole 412, the third via hole 413, and the fourth via hole 414 have substantially the same shape and size. Excluding the process and error measurement, the shapes and sizes of the first via hole 411, the second via hole 412, the third via hole 413 and the fourth via hole 414 are completely the same.

In some embodiments, as shown in FIG. 15, the first one of the first connecting sub-portions 311 and the second one of the first connecting sub-portions 312 are both in a shape of a bent strip. Specifically, the first one of the first connecting sub-portions 311 is bent toward the second one of the first connecting sub-portions 312, and the second one of the first connecting sub-portions 312 is bent toward the first one of the first connecting sub-portions 311.

In some embodiments, as shown in FIG. 15, bent portions of the first one of the first connecting sub-portions 311 and the second one of the first connecting sub-portions 312 are both smoothly rounded corners, so as to avoid a presence of chamfers at the bent portions.

In some embodiments, as shown in FIG. 15, a bending angle θ of the first one of the first connecting sub-portions 311 and the second one of the first connecting sub-portion 312 may be 130°-150°, for example, 140°.

In some embodiments, as shown in FIG. 15, the first one of the first connecting sub-portions 311 and the second one of the first connecting sub-portions 312 are substantially mirror-symmetrical relative to an axis H-H' of the connecting portion 30 parallel to the first direction X. An orthographic projection of a center of a connecting line (which is between a point on the first one of the first connecting sub-portionS 311 closest to the second one of the first connecting sub-portionS 312 and a point on the second one of the first connecting sub-portions 312 closest to the first one of the first connecting sub-portions 311) on the substrate is a center of an orthographic projection of the connecting portion 30 on the substrate.

In some embodiments, as shown in FIG. 15, the connecting portion 30 is an axisymmetric structure, the connecting portion 30 is symmetrical with respect to the axis H-H' parallel to the first direction X, and the connecting portion 30 is symmetrical with respect to an axis V-V' parallel to the second direction Y.

In some embodiments, the second connecting sub-portion 32 has a polyline-liked structure, and is complementary to an edge shape of a first sub-electrode 11 (the first sub-electrode 11 has no electrical connection relationship with the second connecting sub-portion 32). An angle of a bent portion of the second connecting sub-portion 32 protruding toward the first sub-electrode 11 on the upper side and an angle α of a bent portion of the second connecting sub-portion 32 protruding toward the first sub-electrode 11 on the lower side may be 130°~170°, for example, 140°.

In some embodiments, a ratio of a maximum length of the first connecting sub-portion 31 in the first direction X to a minimum length of the second connecting sub-portion 32 in the first direction X is between 2.75 and 3.25, for example, 3.

In some embodiments, an edge of the second connecting sub-portion 32 includes a first polyline 321, a second polyline 322, a third polyline 323 and a fourth polyline 324. In some embodiments, the first polyline 321 is parallel to the fourth polyline 324, and a third direction Z1 that intersects both the first direction X and the second direction Y is defined. In some embodiments, the second polyline 322 is parallel to the third polyline 323, and a fourth direction Z2 that intersects both the first direction X, the second direction Y, and the third direction Z1 is defined. An acute angle between the third direction Z1 and the second direction Y may be 5°-25°, for example, 20°. An acute angle between the fourth direction Z2 and the second direction Y may be 5°-25°, for example, 20°.

In some embodiments, as shown in FIG. 15, the first one of the first connecting sub-portions 311 extends toward the first sub-electrode 11 on the upper side substantially in a direction perpendicular to the third direction Z1, and the first one of the first connecting sub-portions 311 extends toward the first sub-electrode 11 on the lower side substantially in a direction perpendicular to the fourth direction Z2. The second one of the first connecting sub-portions 312 extends toward the first sub-electrode 11 on the upper side substantially in a direction perpendicular to the fourth direction Z2, and the second one of the first connecting sub-portions 312 extends toward the first sub-electrode 11 on the lower side substantially in a direction perpendicular to the third direction Z1.

In some embodiments, the first via hole 411 is in a shape of rectangular, and a longitudinal direction of the first via hole 411 is parallel to the third direction Z1. In some embodiments, a long side of the first via hole 411 is about 0.18 mm, and a short side of the first via hole 411 is about 0.12 mm. In some embodiments, a range of the long side of the first via hole 411 is about 0.15-0.2 mm, and a range of a short side of the first via hole 411 is about 0.1-0.14 mm. In some embodiments, an end portion of an overlapping portion of the first one of the first connecting sub-portions 311 and the first via hole is parallel to the third direction Z1, and a length of the end portion in the third direction Z1 is smaller than a length of the first via hole 411. In some embodiments, a ratio of a length of the long side of the first via hole 411 to a length of the end portion of the overlapping portion of the first one of the first connecting sub-portions 311 and the first via hole in the third direction Z1 is about 2.57. In some embodiments, the ratio of the length of the long side of the first via hole 411 to the length of the end portion of the overlapping portion of the first one of the first connecting sub-portions 311 and the first via hole in the third direction Z1 ranges from about 2-3. In some embodiments, the length of the end portion of the overlapping portion of the first one of the first connecting sub-portions 311 and the first via hole in the third direction Z1 is about 0.07 mm. In some embodiments, the length of the end portion of the overlapping portion of the first one of the first connecting sub-portions 311 and the first via hole in the third direction Z3 ranges from about 0.04-0.1 mm.

In some embodiments, both sides of the first one of the first connecting sub-portions 311 extend from the end portion of the overlapping portion of the first one of the first connecting sub-portions 311 and the first via hole 411 are parallel to the short side of the first via hole 411. For the above two sides, a length from the end portion to an inflection point of a side close to the second one of the first connecting sub-portions 312 is greater than a length from the end portion to an inflection point of a side far away from the second one of the first connecting sub-portions 312. In some embodiments, the length from the end portion to the inflection point of the side close to the second one of the first connecting sub-portions 312 is about 0.25 mm, and the length from the end portion to the inflection point of the side away from the second one of the first connecting sub-portions 312 is about 0.23 mm. In some embodiments, the length from the end portion to the inflection point of the side close to the second one of the first connecting sub-portions 312 is about 0.2-0.3 mm, and the length from the end portion to the inflection point of the side away from the second one of the first connecting sub-portions 312 is about 0.2-0.25 mm.

In some embodiments, the second via hole 412 is in a shape of rectangular, and a direction of a long side of the second via hole 412 is parallel to the fourth direction Z2. In some embodiments, a long side of the second via hole 412 is about 0.18 mm, and a short side of the second via hole 412 is about 0.12 mm. In some embodiments, a range of the long side of the second via hole 412 is about 0.15-0.2 mm, and a range of the short side of the second via hole 412 is about 0.1-0.14 mm. In some embodiments, an end portion of an overlapping portion of the first one of the first connecting sub-portions 311 and the second via hole is parallel to the fourth direction Z2, and a length of the end portion in the fourth direction Z2 is smaller than a length of the second via hole 412. In some embodiments, a ratio of a length of the long side of the second via hole 412 to a length of the end portion of the overlapping portion of the first one of the first connecting sub-portions 311 and the second via hole in the fourth direction Z2 is about 2.57. In some embodiments, the ratio of the length of the long side of the second via hole 412 to the length of the end portion of the overlapping portion of the first one of the first connecting sub-portions 311 and the second via hole in the fourth direction Z2 ranges from about 2-3. In some embodiments, the length of the end portion of the overlapping portion of the first one of the first connecting sub-portions 311 and the second via hole in the fourth direction Z2 is about 0.07 mm. In some embodiments, the length of the end portion of the overlapping portion of the first one of the first connecting sub-portions 311 and the second via hole in the fourth direction Z2 ranges from about 0.04-0.1 mm.

In some embodiments, both sides of the first one of the first connecting sub-portions 311 extend from the end portion of the overlapping portion of the first one of the first connecting sub-portions 311 and the second via hole are parallel to the short side of the second via hole 412. For the above two sides, a length from the end portion to an inflection point of a side close to the second one of the first connecting sub-portions 312 is greater than a length from the end portion to an inflection point of a side far away from the second one of the first connecting sub-portions 312. In some embodiments, the length from the end portion to the inflection point of the side close to the second one of the first connecting sub-portions 312 is about 0.25 mm, and the length from the end portion to the inflection point of the side away from the second one of the first connecting sub-portions 312 is about 0.23 mm. In some embodiments, the length from the end portion to the inflection point of the side close to the second one of the first connecting sub-portions 312 is about 0.2-0.3 mm, and the length from the end portion to the inflection point of the side away from the second one of the first connecting sub-portions 312 is about 0.2-0.25 mm.

In some embodiments, the third via hole 413 is in a shape of rectangular, and a direction of a long side of the third via hole 413 is parallel to the fourth direction Z2. In some embodiments, a long side of the third via hole 413 is about 0.18 mm, and a short side of the third via hole 413 is about 0.12 mm. In some embodiments, a range of the long side of the third via hole 413 is about 0.15-0.2 mm, and a range of the short side of the third via hole 413 is about 0.1-0.14 mm. In some embodiments, an end portion of an overlapping portion of the second one of the first connecting sub-portions 312 and the third via hole is parallel to the fourth direction Z2, and a length of the end portion in the fourth direction Z2 is smaller than a length of the third via hole 413. In some embodiments, a ratio of a length of the long side of the third via hole 413 to a length of the end portion of the overlapping portion of the second one of the first connecting sub-portions 312 and the third via hole in the fourth direction Z2 is about 2.57. In some embodiments, the ratio of the length of the long side of the third via hole 413 to the length of the end portion of the overlapping portion of the second one of the first connecting sub-portions 312 and the third via hole in the fourth direction Z2 ranges from about 2-3. In some embodiments, the length of the end portion of the overlapping portion of the second one of the first connecting sub-portions 312 and the third via hole in the fourth direction Z2 is about 0.07 mm. In some embodiments, the length of the end portion of the overlapping portion of the second one of the first connecting sub-portions 312 and the third via hole in the fourth direction Z2 ranges from about 0.04-0.1 mm.

In some embodiments, both sides of the second one of the first connecting sub-portions 312 extend from the end portions of the overlapping portion of the second one of the first connecting sub-portions 312 and the third via hole are parallel to the short side of the third via hole 413. For the above two sides, a length from the end portion to an inflection point of a side close to the first one of the first connecting sub-portions 311 is greater than a length from the end portion to an inflection point of a side far away from the first one of the first connecting sub-portions 311. In some embodiments, the length from the end portion to the inflection point of the side close to the first one of the first connecting sub-portions 311 is about 0.25 mm, and the length from the end portion to the inflection point of the side away from the first one of the first connecting sub-portions 311 is about 0.23 mm. In some embodiments, the length from the end portion to the inflection point of the side close to the first one of the first connecting sub-portions 311 is about 0.2-0.3 mm, and the length from the end portion to the inflection point of the side away from the first one of the first connecting sub-portion 311 is about 0.2-0.25 mm.

In some embodiments, the fourth via hole 414 is in a shape of rectangular, and a direction of a long side of the fourth via hole 414 is parallel to the third direction Z1. In some embodiments, a long side of the fourth via hole 414 is about 0.18 mm, and a short side of the fourth via hole 412 is about 0.12 mm. In some embodiments, a range of the long side of the fourth via hole 414 is about 0.15-0.2 mm, and a range of the short side of the fourth via hole 414 is about 0.1-0.14 mm. In some embodiments, an end portion of an overlapping portion of the second one of the first connecting sub-portions 312 and the fourth via hole is parallel to the third direction Z1, and a length of the end portion in the third direction Z1 is smaller than a length of the fourth via hole 414. In some embodiments, a ratio of a length of the long side of the fourth via hole 414 to a length of the end portion of the overlapping portion of the second one of the first connecting sub-portion 312 and the fourth via hole in the third direction Z1 is about 2.57. In some embodiments, the ratio of the length of the long side of the fourth via hole 414 to the length of the end of the overlapping portion of the second one of the first connecting sub-portions 312 and the fourth via hole in the third direction Z1 ranges from about 2-3. In some embodiments, the length of the end portion of the overlapping portion of the second one of the first connecting sub-portions 312 and the fourth via hole in the third direction Z1 is about 0.07 mm. In some embodiments, the length of the end portion of the overlapping portion of the second one of the first connecting sub-portions 312 and the fourth via hole in the third direction Z1 ranges from about 0.04-0.1 mm.

In some embodiments, both sides of the second one of the first connecting sub-portions 312 extend from the end portions of the overlapping portion of the second one of the first connecting sub-portions 312 and the fourth via hole 414 are parallel to the short side of the fourth via hole 414. For the above two sides, a length from the end portion to an inflection point of a side close to the first one of the first connecting sub-portions 311 is greater than a length from the end portion to an inflection point of a side far away from the first one of the first connecting sub-portions 311. In some embodiments, the length from the end portion to the inflection point of the side close to the first one of the first connecting sub-portions 311 is about 0.25 mm, and the length from the end portion to the inflection point of the side away from the first one of the first connecting sub-portions 311 is about 0.23 mm. In some embodiments, the length from the end portion to the inflection point of the side close to the first one of the first connecting sub-portions 311 is about 0.2-0.3 mm, and the length from the end portion to the inflection point of the side away from the first one of the first connecting sub-portions 311 is about 0.2-0.25 mm.

Those skilled in the art should understand that, the above-mentioned embodiments are illustrated by taking the rectangular first via, second via, third via, and fourth via as an example. In other embodiments, the shapes of the first via, the second via, the third via, and the fourth via may also be square, rhombus, circular, etc., which will not be repeated here.

The present disclosure provides an electronic device, including the touch panel described in any one of the above-mentioned embodiments. The electronic device may be a product or component with touch and display functions, such as an electronic watch, a vehicle display device, and the like.

Above description is only an illustration of a preferred embodiment of the present disclosure and applied technical principles. Those skilled in the art should understand that, the scope involved in the present disclosure is not limited to the technical solution formed by the specific combination of above technical features, and without departing from the inventive concept, other technical solutions formed by any combination of above-mentioned technical features or their equivalent features are also encompassed, for example, the technical solution formed by replacing the above-mentioned features with technical features disclosed (but not limited to) in the present disclosure with similar functions.

What is claimed is:
1. A touch panel, comprising:
a substrate;
a plurality of first touch electrodes on the substrate and extend in a first direction, wherein at least one first touch electrode comprises a plurality of first sub-electrodes and a plurality of first connecting sub-portions, the plurality of first sub-electrodes electrically connected to each other, and the plurality of first connecting sub-portions are located between two adjacent first sub-electrodes and electrically connect the two adjacent first sub-electrodes; and
a plurality of second touch electrodes on the substrate and extend in a second direction, wherein the second direction intersects the first direction, at least one second touch electrode comprises a plurality of second sub-electrodes and a plurality of second connecting sub-portions, the plurality of second sub-electrodes electrically connected to each other, and the plurality of second connecting sub-portions are located between two adjacent second sub-electrodes and electrically connect the two adjacent second sub-electrodes;
wherein the plurality of first connecting sub-portions at least partially overlaps with the plurality of second connecting sub-portions, so that overlapping structures are formed by the first connecting sub-portions and the second connecting sub-portion as a plurality of connecting portions,
wherein the first touch electrodes and the second touch electrodes are electrically insulated from each other;
wherein the touch panel is provided with a touch area and a non-touch area surrounding the touch area;
wherein the plurality of first touch electrodes and the plurality of second touch electrodes are all located in the touch area, the plurality of connecting portions comprise a first connecting portion, a second connecting portion, and a third connecting portion sequentially away from the non-touch area in the first direction, the first connecting portion and the second connecting portion are adjacent in the first direction, and the second connecting portion and the third connecting portion are adjacent in the first direction;
wherein a distance between a center of an orthographic projection of the first connecting portion on the substrate and a center of an orthographic projection of the second connecting portion on the substrate is less than a distance between the center of the orthographic projection of the second connecting portion on the substrate and a center of an orthographic projection of the third connecting portion on the substrate;

wherein the at least one first touch electrode comprises a first one of the first sub-electrodes, a second one of the first sub-electrodes and a third one of the first sub-electrodes sequentially away from the non-touch area in the first direction, the first one of the first sub-electrodes is adjacent to the second one of the first sub-electrodes, the second one of the first sub-electrodes is adjacent to the third one of the first sub-electrodes, and the first one of the first sub-electrodes is adjacent to the non-touch area;

wherein the first connecting portion is located between the first one of the first sub-electrodes and the second one of the first sub-electrodes, and the first connecting portion is electrically connected to both the first one of first sub-electrodes and the second one of the first sub-electrodes;

wherein the second connecting portion is located between the second one of the first sub-electrodes and the third one of the first sub-electrodes, and the second connecting portion is electrically connected to both the second one of the first sub-electrodes and the third one of the first sub-electrodes;

wherein the third connecting portion is located on a side of the third one of the first sub-electrodes away from the second connecting portion, and the third connecting portion is electrically connected to the third one of the first sub-electrodes; and wherein a difference between the distance from the center of the orthographic projection of the first connecting portion on the substrate to the center of the orthographic projection of the second connecting portion on the substrate and the distance from the center of the orthographic projection of the second connecting portion on the substrate to the center of the orthographic projection of the third connecting portion on the substrate is less than or equal to ½ of a maximum length of the third one of the first sub-electrodes between the second connecting portion and the third connecting portion in the first direction.

2. The touch panel of claim 1, wherein the plurality of connecting portions comprise a fourth connecting portion, a fifth connecting portion, and a sixth connecting portion sequentially away from the non-touch area in the second direction, the fourth connecting portion and the fifth connecting portion are adjacent in the second direction, the fifth connecting portion and the sixth connecting portion are adjacent in the second direction; and wherein a distance between a center of an orthographic projection of the fourth connecting portion on the substrate and a center of an orthographic projection of the fifth connecting portion on the substrate is less than a distance between the center of the orthographic projection of the fifth connecting portion on the substrate and a center of an orthographic projection of the sixth connecting portion on the substrate.

3. The touch panel of claim 2, wherein the at least one second touch electrode comprises a first one of the second sub-electrodes, a second one of the second sub-electrodes, and a third one of the second sub-electrodes sequentially away from the non-touch area in the second direction, the first one of the second sub-electrodes is adjacent to the second one of the second sub-electrodes, the second one of the second sub-electrodes and the third one of the second sub-electrodes are adjacent, and the first one of the second sub-electrode is adjacent to the non-touch area;

wherein the fourth connecting portion is located between the first one of the second sub-electrodes and the second one of the second sub-electrodes, and the fourth connecting portion is electrically connected to both the first one of the second sub-electrodes and the second one of the second sub-electrodes;

wherein the fifth connecting portion is located between the second one of the second sub-electrode and the third one of the second sub-electrode, and the fifth connecting portion is electrically connected to both the second one of the second sub-electrode and the third one of the second sub-electrode; and wherein the sixth connecting portion is located on a side of the third one of the second sub-electrodes away from the fifth connecting portion, and the sixth connecting portion is electrically connected to the third one of the second sub-electrodes.

4. The touch panel of claim 3, wherein a difference between the distance from the center of the orthographic projection of the fourth connecting portion on the substrate to the center of the orthographic projection of the fifth connecting portion on the substrate and the distance from the center of the orthographic projection of the fifth connecting portion on the substrate to the center of the orthographic projection of the sixth connecting portion on the substrate is less than or equal to ½ of a maximum length of the third one of the second sub-electrodes between the fifth connecting portion and the sixth connecting portion in the second direction.

5. The touch panel of claim 4, wherein areas of the first one of the second sub-electrodes and the second one of the second sub-electrodes adjacent to the fourth connecting portion both occupy 50%-100% of an area of the third one of the second sub-electrodes between the fifth connecting portion and the sixth connecting portion; or wherein areas of two first sub-electrodes adjacent to the fourth connecting portion both occupy 50%-100% of an area of one first sub-electrode of two first sub-electrodes adjacent to and electrically connected to the sixth connecting portion, and the one first sub-electrode is farther away from the non-touch area; or wherein the areas of the first one of the second sub-electrodes and the second one of the second sub-electrodes adjacent to the fourth connecting portion and the areas of the two first sub-electrodes adjacent to the fourth connecting portion are all smaller than an area of the third one of the second sub-electrodes between the fifth connecting portion and the sixth connecting portion.

6. The touch panel of claim 1, wherein areas of the first one of the first sub-electrodes and the second one of the first sub-electrodes adjacent to the first connecting portion both occupy 50%-100% of an area of the third one of the first sub-electrodes between the second connecting portion and the third connecting portion; or wherein areas of two second sub-electrodes adjacent to the first connecting portion both occupy 50%-100% of an area of one second sub-electrode of two second sub-electrodes adjacent to and electrically connected to the third connecting portion, and the one second sub-electrode is farther away from the non-touch area; or wherein the areas of the first one of the first sub-electrodes and the second one of the first sub-electrodes adjacent to the first connecting portion and the areas of the two second sub-electrodes adjacent to the first connecting portion are all smaller than an area of the third one of the first sub-electrodes between the second connecting portion and the third connecting portion.

7. The touch panel of claim 1, wherein for one connecting portion of the plurality of connecting portions, the one connecting portion comprises:
the first connecting sub-portion in the first direction, wherein the first connecting sub-portion electrically connects two first sub-electrodes adjacent in the first direction; and
the second connecting sub-portion in the second direction, wherein the second connecting sub-portion electrically connects two second sub-electrodes adjacent in the second direction.

8. The touch panel of claim 7, wherein one of the first connecting sub-portion or the second connecting sub-portion is located on a first electrode layer with the first touch electrode and the second touch electrode; the other one of the first connecting sub-portion and or the second connecting sub-portion is located on a second electrode layer; and an insulating layer is provided between the first electrode layer and the second electrode layer.

9. The touch panel of claim 8, wherein the first connecting sub-portion and the two first sub-electrodes adjacent in the first direction are an integral structure, and the second connecting sub-portion is electrically connected to the two second sub-electrodes adjacent in the second direction through a via hole penetrating the insulating layer.

10. The touch panel of claim 8, wherein the second connecting sub-portion and the two second sub-electrodes adjacent in the second direction are an integral structure, and the first connecting sub-portion is electrically connected to the two first sub-electrodes adjacent in the first direction through a via hole penetrating the insulating layer.

11. The touch panel of claim 7, wherein a maximum length of the first connecting portion in the first direction is equal to about ¼ of a maximum length of the first sub-electrode between the second connecting portion and the third connecting portion in the first direction.

12. The touch panel of claim 7, wherein a maximum length of the second connecting portion in the second direction is equal to about ¼ of a maximum length of one of two second sub-electrodes adjacent to and electrically connected to the third connecting portion, and the one second sub-electrode is farther away from the non-touch area.

13. The touch panel of claim 7, wherein the first connecting sub-portion comprises a first one of the first connecting sub-portions and a second one of the first connecting sub-portions arranged at an interval in the second direction, the first one of the first connecting sub-portions is bent toward the second one of the first connecting sub-portions, and the second one of the first connecting sub-portions is bent toward the first one of the first connecting sub-portions.

14. The touch panel of claim 13, wherein the connecting portion further comprises a first via hole, a second via hole, a third via hole, and a fourth via hole, the first one of the first connecting sub-portions is respectively electrically connected to the two first sub-electrodes adjacent in the first direction through the first via hole and the second via hole, and the second one of the first connecting sub-portions is respectively electrically connected to the two first sub-electrodes adjacent in the first direction through the third via hole and the fourth via hole,
wherein an edge of the second connecting sub-portion comprises:
a first polyline facing the first via hole and extending in a third direction;
a second polyline facing the second via hole and in a fourth direction;
a third polyline facing the third via hole and in the fourth direction; and
a fourth polyline facing the fourth via hole and in the third direction, and
wherein the third direction and the fourth direction both intersect each of the first direction and the second direction, the third direction intersects the fourth direction, the first polyline is connected to the third polyline, and the second polyline is connected to the fourth polyline.

15. The touch panel of claim 14, wherein the first via hole, the second via hole, the third via hole, and the fourth via hole are all rectangular, long sides of the first via hole and the fourth via hole are both parallel to the third direction, and long sides of the second via hole and the third via hole are both parallel to the fourth direction.

16. The touch panel of claim 1, wherein for at least one connecting portion, at least one first sub-electrode adjacent to and electrically connected to the at least one connecting portion is provided adjacent to at least one second sub-electrode adjacent to and electrically connected to the at least one connecting portion, and a boundary between the first sub-electrode and the second sub-electrode is in a shape of polyline.

17. The touch panel of claim 1, wherein the plurality of connecting portions constitute a connecting portion array, the connecting portion array comprises a plurality of columns of connecting portions extended in the first direction and a plurality of rows of connecting portions extended in the second direction, a center of an orthographic projection of a connecting portion in the plurality of columns of the connecting portions column closest to the non-touch area on the substrate is on a straight line, and a center of an orthographic projection of a connecting portion in the plurality of rows of the connecting portions closest to the non-touch area on the substrate is on a straight line.

18. An electronic device comprising the touch panel claim 1.

* * * * *